Figure 1:
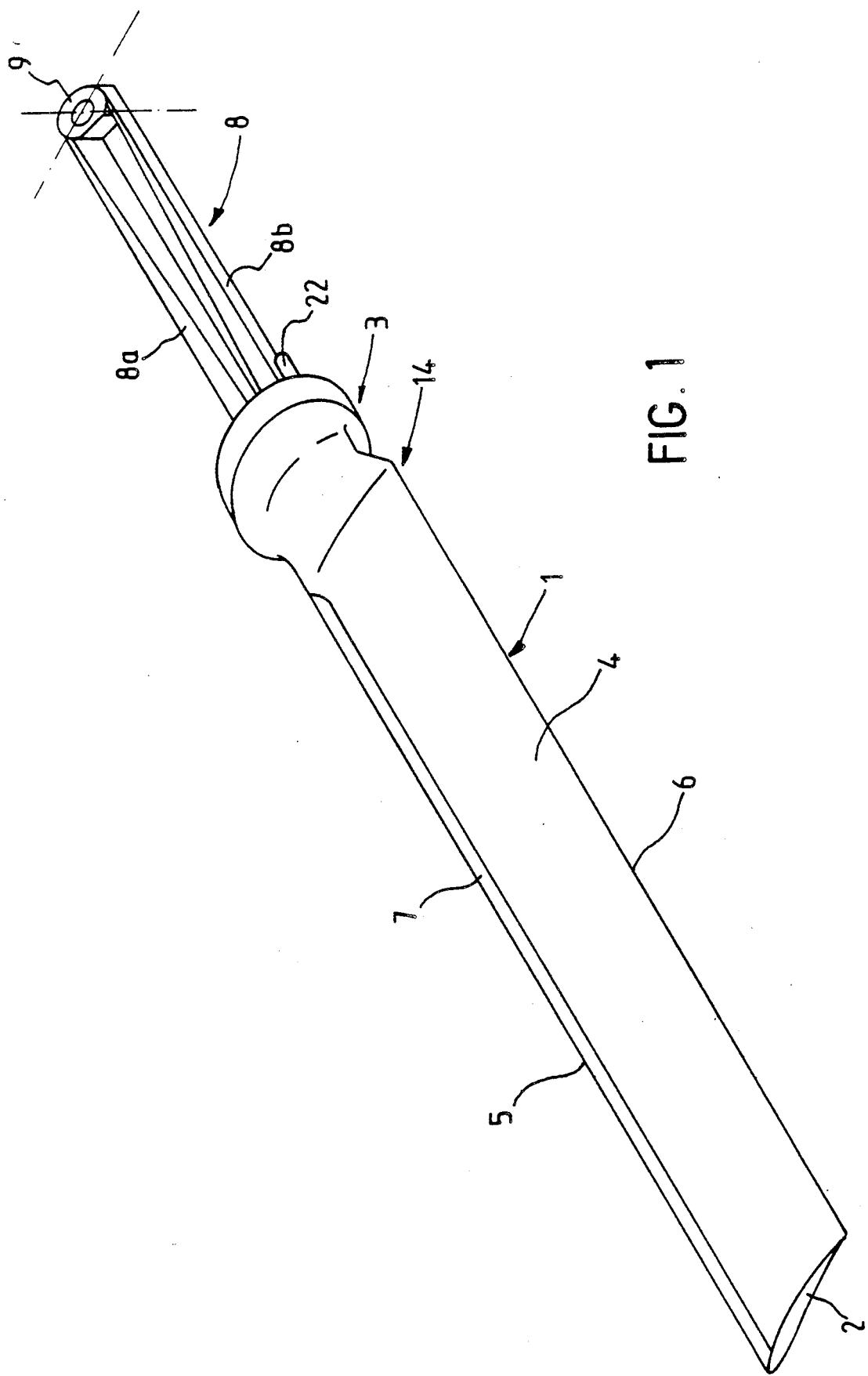

United States Patent [19]

Barbier et al.

[11] Patent Number: 4,990,205
[45] Date of Patent: Feb. 5, 1991

[54] PROCESS FOR MANUFACTURING A BLADE

[75] Inventors: Bruno J. M. Barbier, Sannois; Jean A. Michaud-Soret, Paris, both of France

[73] Assignee: Societe Nationale Industrielle Aerospatiale, Paris, France

[21] Appl. No.: 408,018

[22] Filed: Sep. 15, 1989

Related U.S. Application Data

[62] Division of Ser. No. 203,373, Jun. 7, 1988, Pat. No. 4,892,462.

[30] Foreign Application Priority Data

Jun. 9, 1987 [FR] France ............................ 87 07981

[51] Int. Cl.⁵ ............................................ B29C 43/20
[52] U.S. Cl. .................................... 156/242; 156/245; 29/889.71; 29/889.6; 416/226; 416/230; 416/239; 416/241 A
[58] Field of Search ............... 156/242, 245; 416/226, 416/230, 239, 241 A, 230 A, 134 A; 29/156.8 R, 156.8 B, 156.8 P

[56] References Cited

U.S. PATENT DOCUMENTS

| | | | |
|---|---|---|---|
| 4,298,417 | 11/1981 | Euler et al. | 156/245 |
| 4,470,862 | 9/1984 | More et al. | 156/245 |
| 4,639,284 | 1/1987 | Mouille et al. | 156/245 |
| 4,648,921 | 3/1987 | Nutter | 156/242 |

FOREIGN PATENT DOCUMENTS 0061567 2/1982 European Pat. Off. .
0121462 10/1984 European Pat. Off. .
2082964 3/1982 United Kingdom .

*Primary Examiner*—Caleb Weston
*Attorney, Agent, or Firm*—Armstrong, Nikaido, Marmelstein, Kubovcik and Murray

[57] ABSTRACT

The blade of composite materials and its manufacturing process according to the invention are such that the spar includes at least one bundle (10a, 10b) extending longitudinally in the shell (4), between the fillings of the leading edge (12a) and the trailing edge (12c) and which adheres directly to the laminated pressure face and suction face coverings, (4a, 4b) of the rigid shell (4).

Beyond the blade footing (3), the spar is shaped to form a root loop flexible in torsion (8) and passing round an attaching socket (9) on the hub.

Application to variable pitch multi-blade propellers for the streamlined tail rotors of helicopters.

5 Claims, 10 Drawing Sheets

PROCESS FOR MANUFACTURING A BLADE

This is a division of application Ser. No. 203,373 filed June 7, 1988, U.S. Pat. No 4,899,462.

The present invention relates to improvements made to blades of composite materials such as the one described in French patent application No. 83 04 448, filed on 18th. Mar. 1983 in the name of the Applicant.

More precisely, the object of the invention is a blade, essentially of composite materials, designed in particular to equip a multi-blade propeller of variable pitch and with individually removable blades, the propeller being usable, in particular, as the tail rotor, preferably streamlined, of a rotorcraft such as a helicopter.

The above-mentioned patent application, which discloses such a variable pitch multi-blade propeller, usable as the streamlined tail rotor of a helicopter, and each of whose blades is individually removable, proposes a blade of the type comprising:

- a shell with an aerodynamic profile, having a suction face covering and a pressure face covering that extend from the leading edge to the trailing edge of the blade and along which trailing edge they are connected to one another, the shell comprising at least one layer of fabric of fibres with high mechanical strength agglomerated by a polymerised synthetic impregnation resin, and having an internal end (designed to be orientated towards a hub when the blade equips a propeller) formed into a blade footing,
- a spar with a longitudinal axis substantially parallel to that of the blade, and comprising at least one elongated core of rovings of fibres with high mechanical strength agglomerated by a polymerised synthetic resin, the largest portion of the spar being housed in the shell and fixed by adherence of its suction face directly against the internal face of the opposite portion of the suction face covering of the shell, and an internal end portion of the spar, emerging from the shell and passing through the blade footing, forming a root portion flexible in torsion and flexion, arranged in a loop that surrounds, by its internal end, a single attaching socket, by which the blade is designed to be individually attached to a hub,
- a filling placed in the shell, between the pressure face and suction face coverings and the spar, and
- a member for controlling the pitch of the blade, which is integral with the blade footing and designed to be mounted in rotation upon the hub about the longitudinal axis of the blade and to apply to the shell a twisting moment substantially centered on the longitudinal axis of the spar.

In the blade that is described in French patent application No. 83 04 448 aforementioned, the filling placed in the shell, between the coverings and the spar, is a single filling body, of a synthetic cellular or foam material, which is preformed so that it can be placed in the shell and which comprises a cutout portion extending over its entire length, and opening in the face of the body orientated towards the suction face portion of the shell, while the spar is constituted by a single elongated strip of rovings whose portion that is fixed in the shell is arranged in the housing delimited by the cutout portion, with a section corresponding substantially to that of the strip, in the filling body and the opposite suction face portion of the shell, and this strip portion by which the spar is fixed in the shell being fixed directly by its face orientated towards the suction face against this suction face portion of the shell.

The drawback of such an embodiment is that the structure of the blade is not balanced, insofar as the spar is thrust, on one hand, by its front and rear end faces as well as by its pressure face surface, against the opposite faces of the cutout portion of the foam filling body and, on the other hand, by its suction face, solely against the internal face of the suction face covering of the blade. As a result, the induced flapping flexion shearing is taken up solely at the two small surfaces, substantially contained in the plane of the chord of the blade, and adjacent one to the leading edge and the other to the trailing edge of the blade which, moreover, can be manufactured only by moulding comprising at least two operations, namely the prior moulding of the filling body to the section of the blade and with its cutout portion, and then the final moulding after removal successively of all the elements constituting the blade in two half-moulds enabling, after assembly, the whole to be hot polymerised as described in greater detail in the above-mentioned French patent application.

From Canadian patent No.1 197 468, a blade is also known comprising a shell with an aerodynamic profile, having suction face and pressure face coverings that are laminated and comprise at least one layer of fabric of fibres with high mechanical strength coated by a polymerised synthetic impregnation resin, and a spar with a longitudinal axis substantially parallel to that of the blade and comprising two elongated cores housed in the shell and each fixed by adherence of its suction and pressure face surfaces directly to the inner faces of the opposite portions of the suction face and pressure face coverings of the shell.

However, in the said Canadian patent, which relates to a blade of large dimensions, designed to equip a high power wind or aeolian device, the running portion of the blade is constituted by the assembly of three modular elements, namely a central spar module, a leading edge module and a trailing edge module. The central spar module constitutes the central portion, along the chord of the blade, which connects the leading edge module to the trailing edge module and which has, in its forward portion, adjacent to the leading edge module, as in its rear portion, adjacent to the trailing edge module, pressure face and suction face covering portions that are profiled and connected to one another by a core of the spar, constituted by a foam filling. The volume internal to the spar module, and delimited between the two foam cores of the latter, is hollow, and each core is formed by cementing, along a join plane, substantially identical with the plane lying on the chord of the blade, two half-cores, each of which is made with a corresponding pressure face portion or suction face portion of the spar module. Similarly, the leading edge and trailing edge modules, which remain hollow, are each constituted by assembling a pressure face portion and a suction face portion.

Such a blade, whose three constituent modules are manufactured separately, each from a pressure face portion and a suction face portion, then assembled, and of which the cores of the spar, made of foam, are definitely not of such a nature as to be able to constitute directly the member for attaching the blade to a hub, is thus a blade very much different from that of the type described above, and already known from French patent application No.83 04 448 aforementioned.

The invention proposes to eliminate the drawbacks, already described hereabove, of the blade known from the above-mentioned French patent application, and the object of the invention is to propose a blade, of the type mentioned above, whose structure offers improved breaking strength, increases the surface resisting induced flapping flexion shearing, and makes it possible to obtain better manufacturing quality, connected with the repetitive nature of the mode of operation, in particular as regards the arrangement of the rovings constituting the spar, and the possibility of moulding the blade in a single moulding operation, after initial assembly of all the constituents of the blade in a wet state in a single mould, and using a single polymerisation stage.

The object of the invention is also to propose a blade whose new architecture considerably increases the impact strength of the whole of the blade structure.

For this purpose, the spar centered on the longitudinal axis of the blade is in a single piece, with a substantially rectangular cross-section, and is also fixed, in its portion housed in the shell, by adherence of its pressure face surface directly to the inner face of the opposite portion of the pressure face covering of the shell, and the filling includes at least two filling bodies, one of which is arranged between the spar and the leading edge and the other between the spar and the trailing edge of the blade. In this way, a blade is obtained whose structure includes at least two torsion boxes, distributed along the chord of the blade, and each of which has sufficient structural strength to withstand the aerodynamic and pitch change forces, when the other box is damaged. In the event of impact or of deterioration of the leading edge or the trailing edge, the structure preserves sufficient torsional rigidity to be able to control the blade. In addition, the adherence by cementing of the spar directly to the pressure face and suction face coverings increases the surface resisting the induced flapping flexion shearing.

These advantages are considerably enhanced if, according to a first particular example of embodiment, the spar is divided into two bundles, spaced apart from one another in the shell, extending longitudinally and on either side of the axis of change of blade pitch, and coacting with the suction face and pressure face coverings forming a triple torsion box, the filling being constituted by three filling bodies one of which is arranged between the two bundles of the spar and between the pressure face and suction face coverings of the shell, a second one of which is a leading edge filling body, housed at the front of the front bundle of the spar, and the third of which is a trailing edge filling body, housed at the rear of the rear bundle of the spar.

An additional and essential advantage of this structure is that it makes possible, as described below, polymerisation of the spar under tensile stress, which improves its breaking strength, particularly when the rovings of the spar are rovings of aramide fibres, such as KEVLAR (registered trade-mark), whose tensile strength can thus be up to twice the value obtained in the absence of tension.

In this example, the three filling bodies can advantageously be of a light, cellular or foam synthetic material, according to one simple, inexpensive embodiment. However, in this case, it is at the same time advantageous for the leading edge filling body to be reinforced at the front by mats or sheets of reinforcing fibres agglomerated by a polymerised synthetic resin, and extending longitudinally and directly adjacent to the pressure and suction face coverings, at the leading edge, the mats or sheets of reinforcing fibres being preferably constituted by longitudinal strands of carbon in order, on one hand, to prevent "hammering" of the leading edge during flight in sand-laden atmosphere, even if the leading edge is protected by a rigid cap, for example of titanium, and on the other hand, to rigidify the section of the blade against flapping forces and moments.

Advantageously, in order for the shell to possess good rigidity in torsion, it is advantageous for the shell to be laminated and include, from inside to outside, two superposed mats or sheets of carbon fibres impregnated with a polymerised synthetic resin, a layer of fabric of aramide fibres whose warp and weft threads are substantially inclined at an angle of 45° to the longitudinal axis of the blade, and finally a film of adhesive, which ensures the good outer surface condition of the moulded shell.

In order for the blade footing to ensure good take-up of the flapping and trailing forces and moments of the blade, and to permit the application of the moments of pitch change control to the root portion that is flexible in torsion and flexion of the spar, the blade footing comprises, advantageously, starting from a circular radial flange for securing to the pitch control member, at its axial end towards the socket for attachment to the hub, a transition zone that connects the flange to the running portion of the blade and that is of decreasing thickness and, at least in a portion in the vicinity of the flange, of progressively increasing width, the transition zone comprising a laminated suction face reinforcement and a laminated pressure face reinforcement, each constituted by a piling of layers of fabric of glass fibres agglomerated by a polymerised synthetic impregnation resin, each reinforcement being arranged, in a portion adjacent to the running portion of the blade, between the corresponding covering and the spar, and having a thickness increasing progressively up to an area of subdivision of each reinforcement into two portions, whereof one, the inner radial portion, remains adjoined to the spar up to the end flange, and whereof the other, the outer radial portion, remains adjoined to the corresponding covering up to the flange, against which the layers of the outer portion of each reinforcement are radially orientated, in order to form a radial collar for connection to the flange, the inner and outer portions of each reinforcement being separated from one another by a synthetic filling element, such as a polyurethane foam, progressively increasing in thickness up to the flange.

In order to ensure that the pitch control member is well secured to the blade footing, for the transmission of pitch control, the flange for linking the blade footing to this control member includes a plurality of radial layers of fabric of glass fibres adjoined to one another and agglomerated by a polymerised synthetic impregnation resin, and ends of members such as bolts, for mechanically fixing the pitch control member to the blade footing, are retained, in the form of inserts, in these radial layers of glass fibre fabric.

Furthermore, to prevent penetration of the shell by dust or water, at the blade footing, and along the root portion of the spar, the connecting flange of the blade footing has, advantageously, on the side orientated towards the attaching socket, a central cavity in which is housed a seal, traversed by a compressed portion of the spar, in which the two spar bundles are drawn towards one another.

In order for the pitch control member to ensure correct fitting and correct guiding in rotation of the blade on the hub, on one hand, and, on the other hand, in order for the blade equipped with such a pitch control member to be compatible with the structure of the hub of the propeller described in French application No. 83 04 448, the pitch control member is a metallic bearing formed to make a sleeve axially traversed by the root portion of the spar, and which bears, radially projecting in relation to its axis and axially orientated towards the attaching socket, a pitch control finger, and the axial end of the sleeve, on the side opposite the socket, has a radial flange whereby the bearing is made integral with the blade footing. In addition, the axial end of the bearing towards the socket also has a radial flange, and each of the two end flanges of the bearing has, on its periphery, a circular journal centered on the longitudinal axis of the blade, and by which the bearing is designed to be mounted in rotation in one of two corresponding openings provided coaxially in parts of the hub that are radially spaced apart, as described in greater detail in the above-mentioned French patent application.

According to a second example of a blade according to the invention, also designed to be moulded in a single operation, but having a more solid structure, the portion of the spar received in the shell is a single longitudinal bundle, solid and substantially flat, connecting to one another the pressure and suction face coverings that each comprise an outer skin internally reinforced, from the leading edge and to a point beyond the spar, in the direction of the trailing edge, by a sole for rigidifying the blade in flapping, each sole being laminated and constituted by longitudinal mats or sheets of unidirectional fibres of carbon agglomerated by a polymerised synthetic impregnation resin ensuring the connection by adherence of the pressure and suction faces of the spar directly to the inner faces of the corresponding soles.

Similarly, in order to increase the rigidity of the blade in the trailing plane, it is advantageous for the two filling bodies housed in the shell and on either side of the spar also to be constituted each by longitudinal mats or sheets of unidirectional carbon fibres agglomerated by a polymerised synthetic impregnation resin.

In order for the shell to form a box rigid in torsion, and to have a good surface condition after leaving the mould, the skin of each covering is advantageously laminated and constituted, from inside to outside, by two layers of fabric of aramide fibres whose warp and weft threads are substantially at an angle of 45° in relation to the leading edge, and by a film of adhesive ensuring a good outer surface condition.

In order to favour the taking up of the flapping and trailing forces and moments of the blade, as well as the application of the forces of pitch change control to the root portion, the blade footing advantageously comprises, towards the attaching socket, a portion shaped to form a frustoconical tubular end piece, having its small base orientated towards the socket, and, on the other side, a transition portion that connects the end piece to the running portion of the blade, and which has a progressively increasing thickness from this running portion to the end piece, to which it is connected at the inner radial edge of an annual radial stop formed by a piling of radial layers of fabric of glass fibres agglomerated side by side by a polymerised synthetic impregnation resin, and which closes a frustoconical, peripheral sleeve of the end piece, at its large base. The sleeve is also constituted by glass fibre fabric, and the ends of the coverings of the shell in the transition zone cover a collar or bond also constituted by glass fibre fabric, which confines the portion of the spar traversing the blade footing, and which has a thickness that increases progressively from the running portion of the blade to the end piece, and extends inside the latter, traversing the central passage of its annular abutment up to a seal internal to the end piece and traversed by the spar.

The seal, which prevents penetration of the shell, at the blade footing, by foreign bodies displaced along the spar, is surrounded in the end piece by the internal end portions of the mats or sheets of carbon of the two filling bodies and/or the reinforcing soles, which are separated from the skins of the coverings at the radial abutment of the end piece and surround the bond or collar in the portion of it engaged in the end piece, the centering of the seal in the end piece also being ensured by at least one complementary filling body, of polyurethane foam, which is housed against the radial abutment and against the internal face of the sleeve of the end piece, in substantially half of the latter on the side of the transition zone, and which is internally lined by the end portions of the carbon mats or sheets, which internally line the sleeve in substantially half of the latter located on the side of the attaching socket.

To ensure the fitting and guiding in rotation of the member for controlling the pitch of the propeller on a hub, as well as the compatibility of the blade equipped with its pitch control member with the hub described in the above-mentioned French patent application, it is advantageous for the pitch control member to be a bearing arranged as a tubular barrel traversed by the root portion of the spar, and including, on the side opposite the attaching socket, a section of frustoconical shape with its small base orientated towards the socket, by which the bearing is fixed by a tapered fit and the interposing of a film of adhesive, on the tubular end piece of the blade footing, the barrel also including, towards the socket, a substantially cylindrical section, smaller in diameter than the frustoconical section, which is connected to the latter by a substantially frustoconical central flared portion, and which bears, radially projecting in relation to its axis, a pitch control lever. In addition, the axial ends of the barrel are each advantageously surrounded by a ring shrunk on to the barrel, which is designed to be mounted so as to journal about its axis on two portions of a hub radially separated from one another, and each of which has one of two coaxial circular openings, in which the shrunk-on rings of the barrel are mounted in rotation, in a manner similar to that described in the above-mentioned French patent application.

Advantageously, in this example, each shrunk-on ring, which constitutes a wearing part, has a cylindrical peripheral journal constituted by a ceramic lining of great hardness. This technical measure makes it possible to protect the surfaces in contact with the parts of the hub in which the rings journal. Furthermore, the blade according to this example can advantageously include a balancing weight constituted by a metallic wire, of high density, embedded in a synthetic resin lodged in a cavity provided under the end that is situated towards the socket on the ring at the end opposite the socket on the barrel.

Advantageously, in the two examples of blades described hereabove, the spar is constituted by unidirectional rovings, preferably of aramide fibres, wound in skeins about two sockets in order to obtain two parallel bundles looping round the sockets. One of the ends of this skein formed by a certain length of the two parallel bundles and their winding about the corresponding socket constitutes the root portion of the spar and its device for attachment to the hub, while the other end of the skein formed by the rest of the length of the two parallel bundles before their winding round the second socket constitutes the part of the spar received in the shell.

This skein-like constitution and arrangement of the rovings of the spar permits natural alignment of very high quality of the aramide fibres in the portion forming the loop that surrounds the attaching socket and, in its prolongation, to the ends of the portions of the spar received in the shell in such a way that the said fibres are uniformly affected by the forces and moments to which the spar is subjected.

Advantageously, in the blade according to the first example described hereabove, the two bundles of rovings of the spar are pressed together in their portion traversing the blade footing, between the looped root portion and the portions that are engaged and held apart from one another in the shell, so as each to form one of the two branches of the spar.

In the second example of a blade presented above, the two bundles of rovings of the spar are also pressed against one another by their portion passing through the blade footing, between the looped root portion and the parts that are engaged and held in the shell, but the latter are applied against one another in the shell so as to form the single-branch spar.

Also advantageously, the bundles of roving of the spar have in their looped root portion a thickness, measured parallel to the axis of the attaching socket, that increases progressively from the blade footing to the socket, and further having, perpendicular to the axes of the socket and of the blade, a width that decreases progressively from the blade footing to the socket, these developments in the width and thickness of the bundles being such that the section remains constant. This geometrical shape of the spar, in its root portion, combined with the low shearing modulus of the unidirectional rovings of aramide fibres that constitute it ensure good flexibility in torsion of the root portion.

Finally, the structure of the blade is completed by the presence of a rigid cap for protecting the leading edge, which is integrated with the shell, and which can be metallic, for example of titanium sheet, or, according to a characteristic proper to the invention, of moulded polyurethane, which enables the outer profile of the blade to be produced with precision and which possesses excellent resistance to erosion by sand.

The invention also relates to a process for manufacturing the blade, by means of a lower half-mould and an upper half-mould the complementary impressions of which have respectively the forms of the pressure face portion and the suction face portion of the blade.

As already known from the above-mentioned French patent application, this process consists:
- in depositing in the lower half-mould a panel of each of the layers of fabric and mats or sheets of fibres with high mechanic impregnated with a polymerisable synthetic resin, and designed to constitute the pressure face covering of the shell of the blade,
- in putting in place, over these panels, the materials that constitute the filling bodies, and in the area of the blade footing, the constitute the filling bodies, and in the layers of fabric and/or mats or sheets of reinforcing fibres, impregnated with a polymerisable synthetic resin, of the pressure face portion of the shell,
- in putting in place, over these panels and layers of fabric and/or mats or sheets of fibres for reinforcing the pressure face portion of the blade, and between these filling bodies, the skein of rovings of aramide fibres agglomerated by a polymerisable synthetic resin and wound round two end sockets, so as to form the spar of the blade, on one hand in its root portion comprising one of the two sockets around which the skein is wound and a certain length of the two bundles on either side of the socket, and on the other hand the rest of the length of the two bundles constituting the portion of the spar received in the shell,
- in putting in place, in the area of the blade footing and over the spar, the layers of fabric and/or mats or sheets of reinforcing fibres impregnated with a polymerisable synthetic resin of the suction face portion of the shell,
- in arranging on the whole thus formed in the lower half-mould a panel of each of the layers of fabrics and/or mats or sheets of fibres with high mechanical strength impregnated with a polymerisable synthetic resin which are designed to constitute the suction face covering of the hull, and
- in placing the upper half-mould on the lower half-mould, and in closing the mould, then in polymerising the resin or resins impregnating and/or agglomerating the elements enclosed in the mould, so as to mould the blade in a single operation.

In addition, however, according to a characteristic proper to the invention, the process consists, prior to polymerisation, in subjecting the skein of rovings constituting the spar to longitudinal traction, substantially parallel to the longitudinal axis of the blade, and in maintaining the tensioning of the rovings throughout polymerisation.

A remarkable consequence of this polymerisation under tension is that this tension is distributed uniformly through the rovings in such a way that, as they are all subjected to the same stresses, they thus possess a better breaking strength and in such a way that the repetitiveness of the mode of operation makes it possible to ensure that the improved quality is constant.

This can be achieved simply by using, to constitute the spar, the skein of rovings forming a closed, elongated loop, that is placed in the mould in such a way that its end portion on the side opposite that surrounding the attaching socket, projects longitudinally beyond the impressions of the half-moulds and surrounds a tension socket held on a pin mounted in at least one of the half-moulds, and the process according to the invention also consists, after polymerisation and removal from the mould, in cutting off the excess portion of the spar, possibly with a portion of the end of the shell and of the filling bodies.

In addition, in order to obtain blades having the particular structure of the blade footing described above, the process further consists in placing the layers of fabric of the bond or collar, the abutments and sleeves or of the radial flange of the blade footing, and the complementary filling elements of polyurethane foam, in the pressure face and suction face portions of the blade, respectively before and after putting in place the bundles of rovings of the spar.

Finally, to ensure the good surface condition of the shell upon leaving the mould, the process further consists advantageously in initially spreading a film of adhesive in the portions of the prints of the half-moulds that correspond to the shell of the blade.

Figure 2:
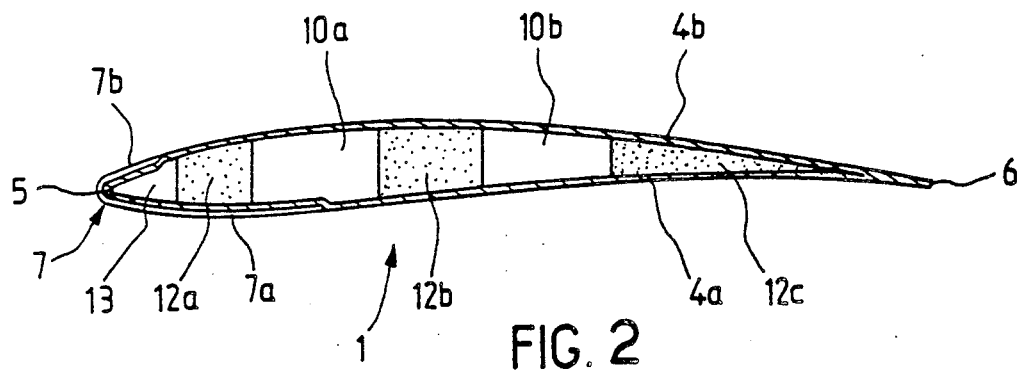
Figure 6:
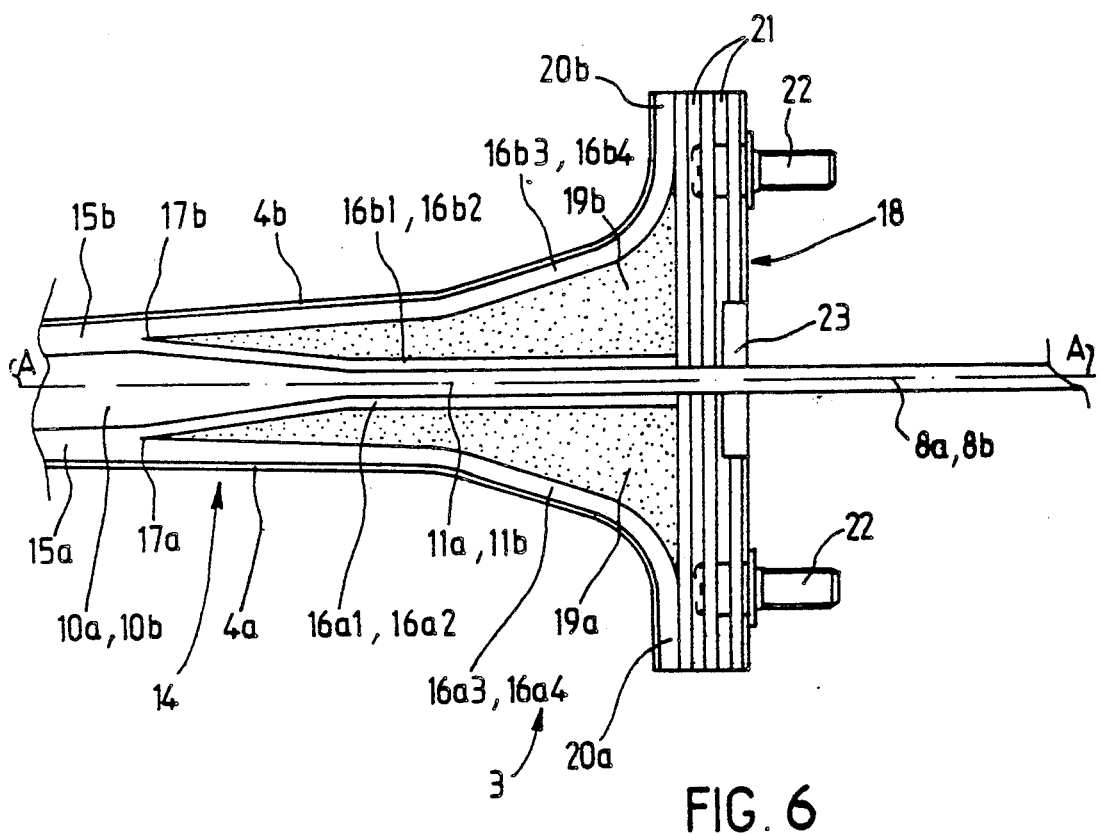
Figure 7:
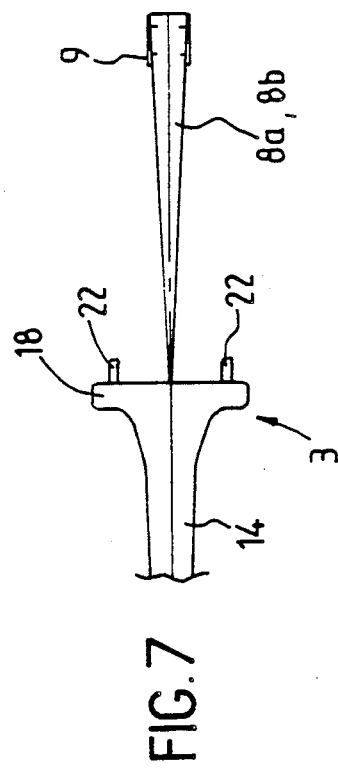
Figure 3:
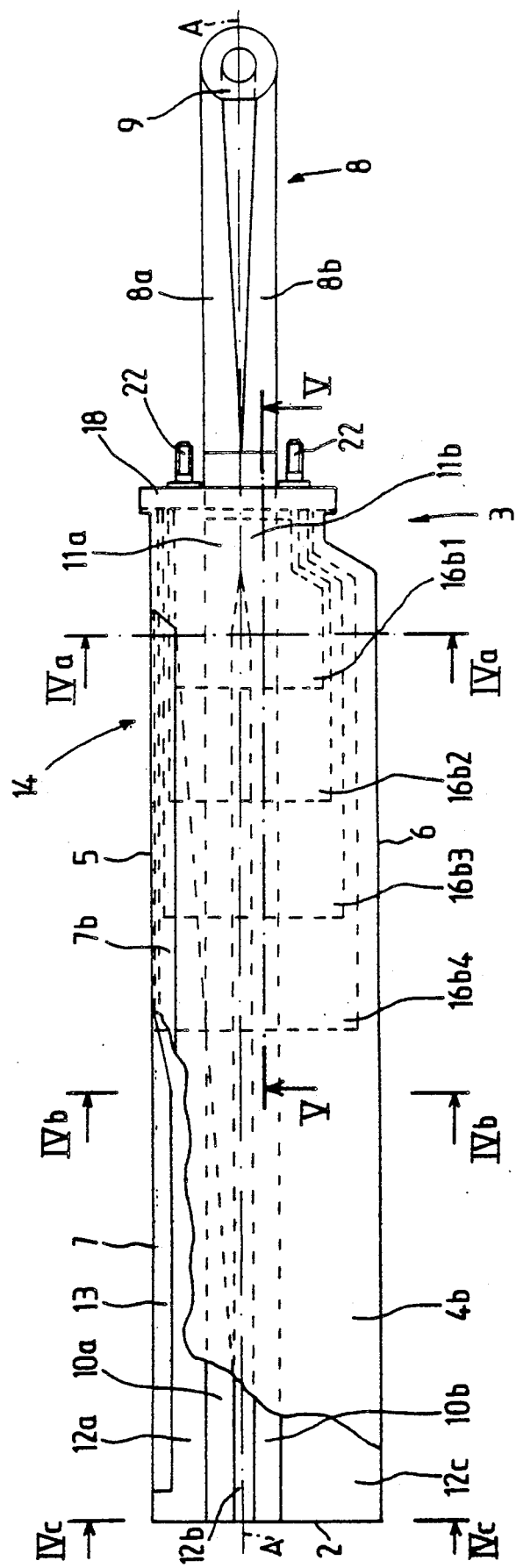
Figure 4A:
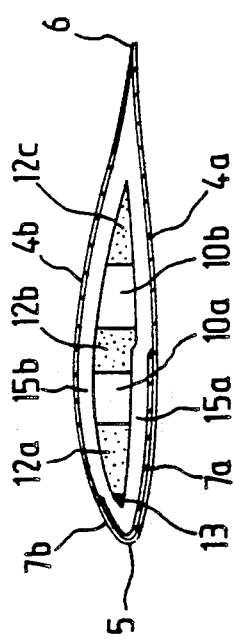
Figure 4B:
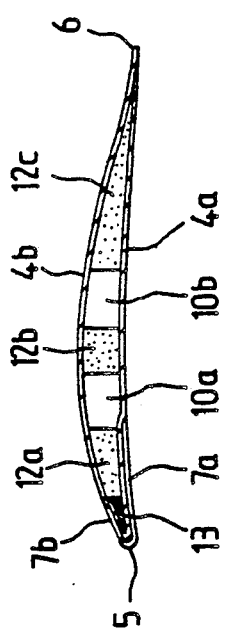
Figure 4C:
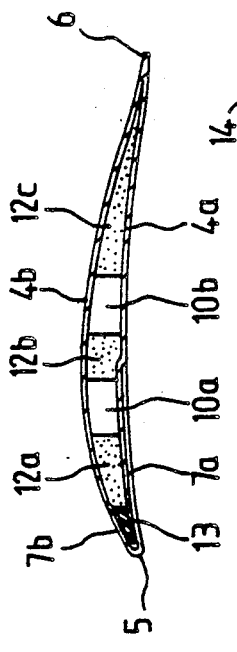
Figure 5:
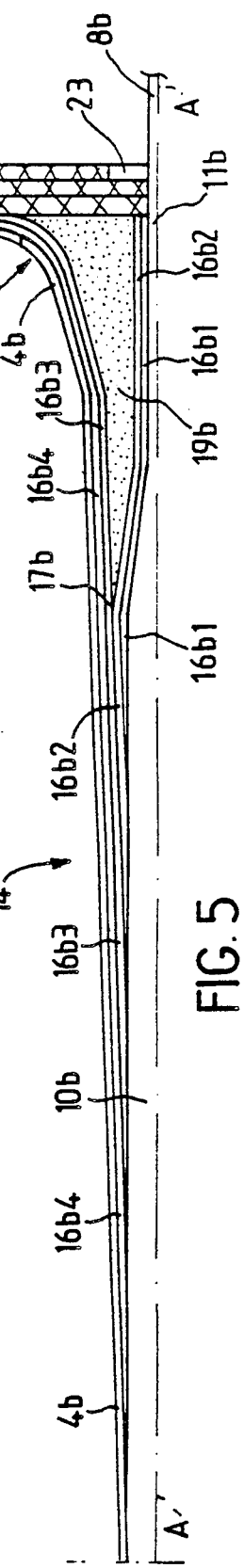
Figure 8:
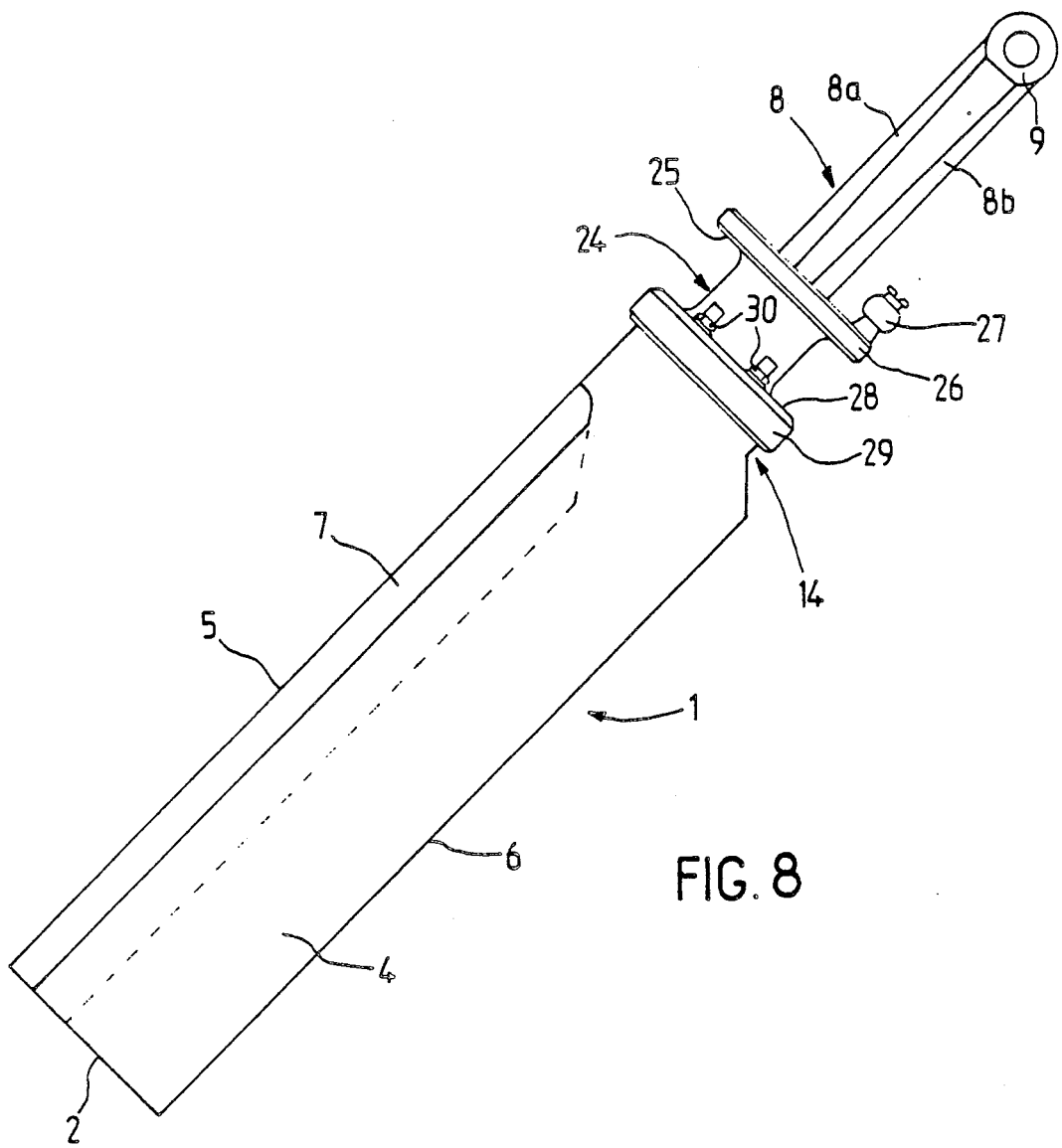
Figure 9:
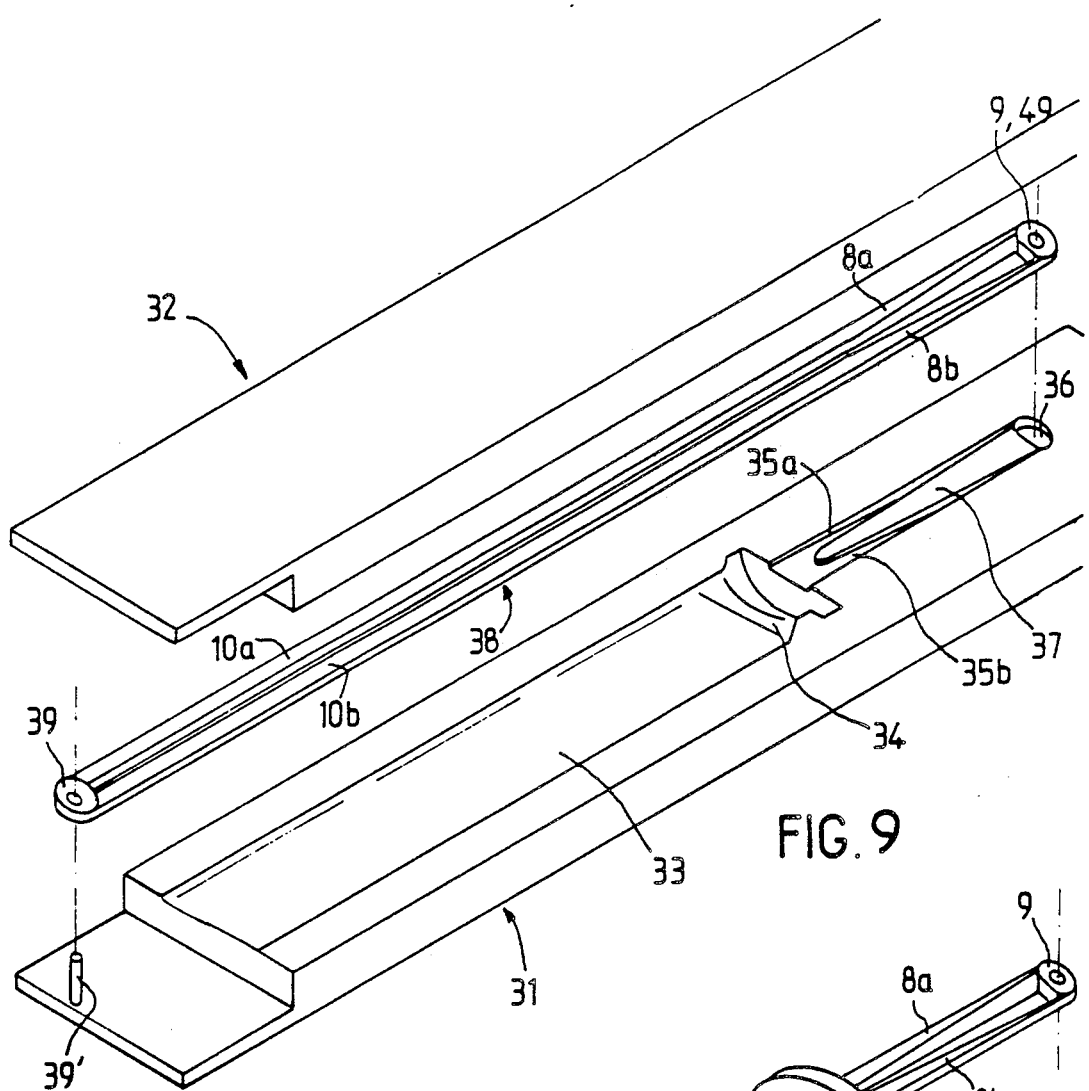
Figure 10:
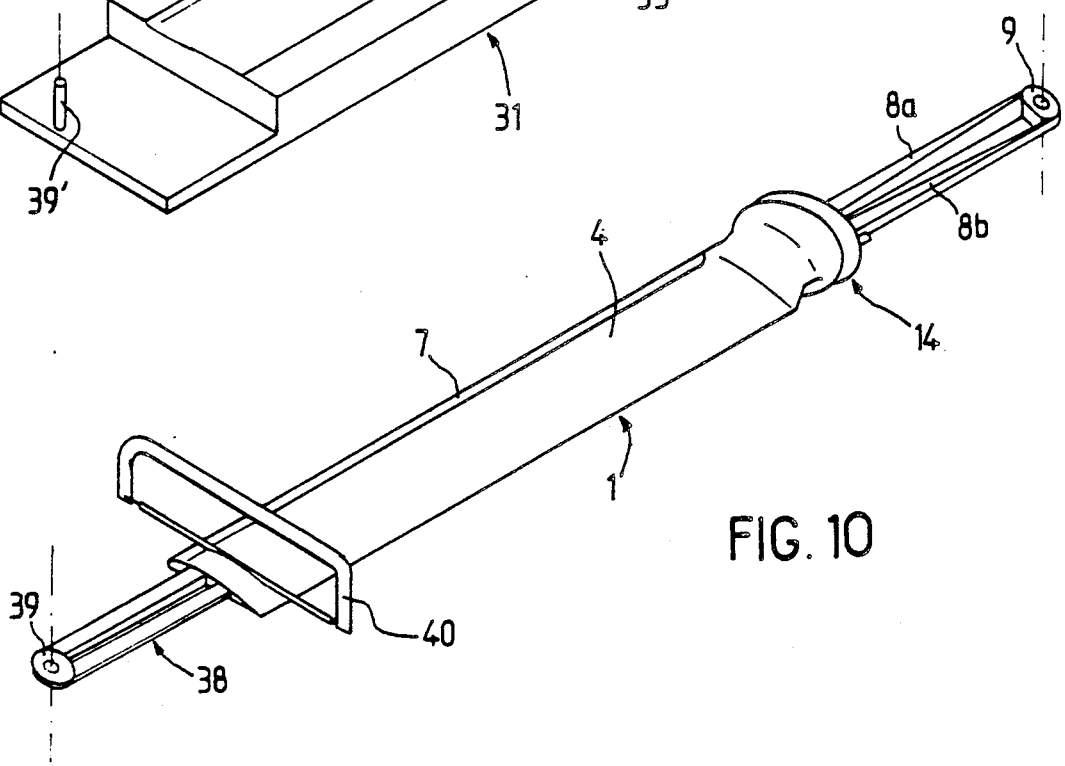
Figure 11:
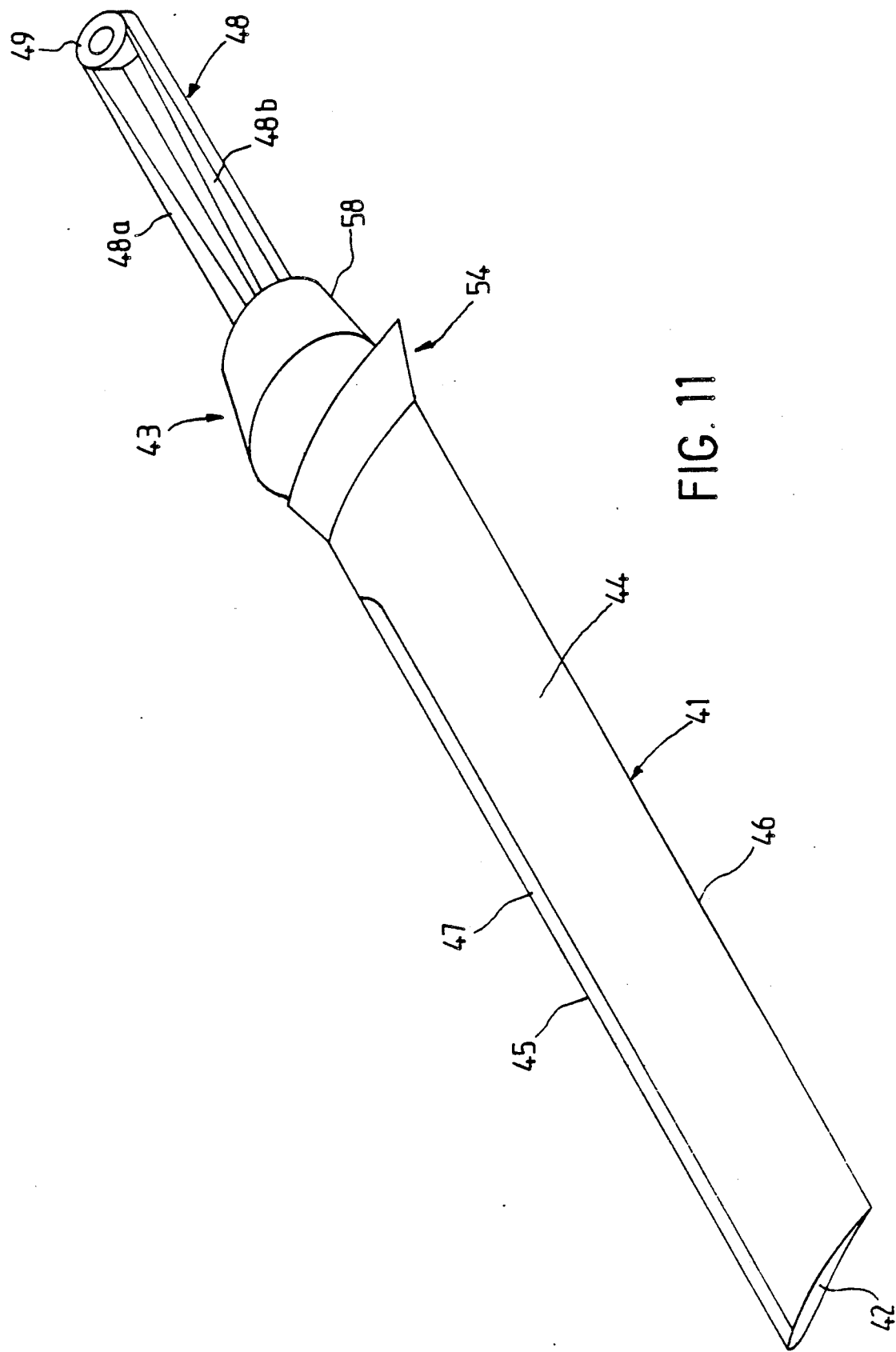
Figure 12:
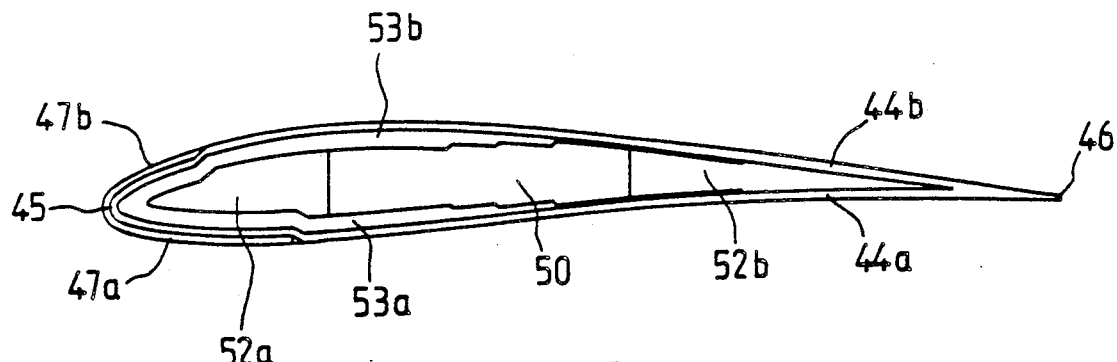
Figure 13:
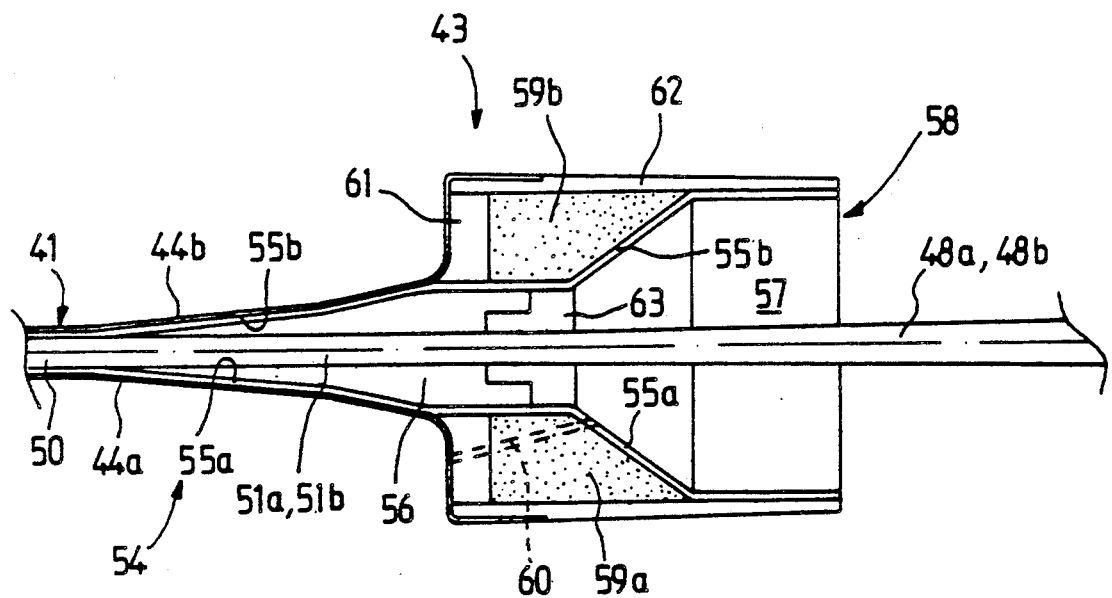
Figure 14:
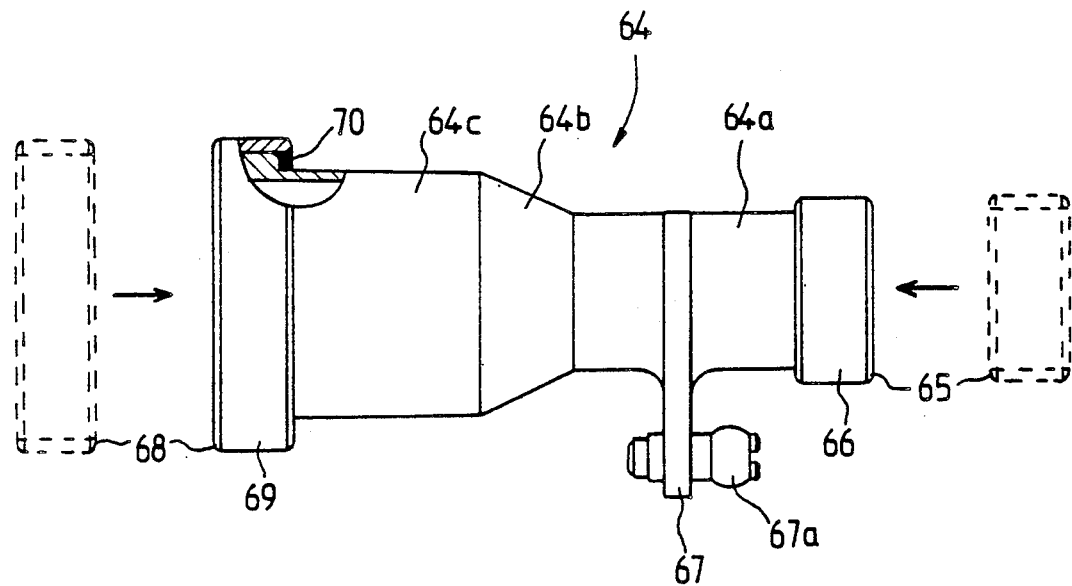
Figure 16:
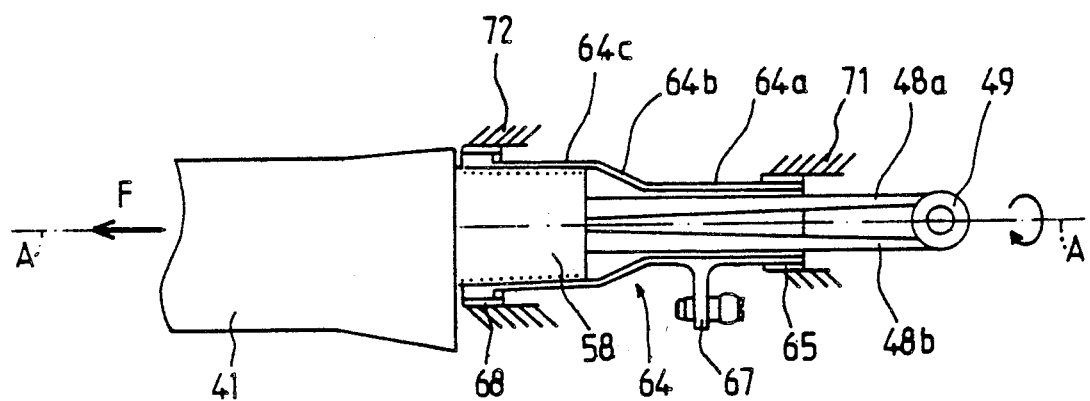

The present invention will be more readily understood, and further advantages and characteristics of the invention will become apparent from the description given below, on a non-limitative basis, of two particular examples of embodiment described with reference to the annexed drawings wherein:

FIG. 1 is a perspective view of an example of the blade after leaving the mould, FIG. 2 is a cross-sectional view of the blade of FIG. 1, in its running portion, FIG. 3 is a plan view of the blade in FIG. 1, with partial removal of its covering at the blade end, FIGS. 4a, 4b, 4c represent three cross-sections along IVa—IVa, IVb—IVb and IVc—IVc in FIG. 3, and illustrate the development of the profile of the blade from its footing to its end, FIG. 5 is a partial longitudinal half-section along V—V of FIG. 3, FIG. 6 is a partial view in longitudinal section of the blade footing, FIG. 7 is a partial view in side elevation of the blade footing and of the root portion of the spar, FIG. 8 is a plan view of the blade of FIG. 1 equipped with a metallic bearing equipped for pitch control, FIG. 9 is a diagram illustrating the process of moulding the blade of FIG. 1 in two complementary half-moulds and in a single operation, FIG. 10 schematically represents the final stage of manufacture of the blade in FIG. 1, FIG. 11 is a perspective view of another example of a blade after leaving the mould, FIG. 12 is a cross-sectional view of the blade of FIG. 11 in its running portion, FIG. 13 is a partial view in longitudinal section of the footing of the blade in FIGS. 11 and 12, FIG. 14 is a view in side elevation representing the bearing equipped with the means of controlling the pitch of the blade in FIGS. 11 to 13, FIG. 15 is a plan view of the blade in FIG. 11 equipped with the bearing in FIG. 14, and FIG. 16 is a schematic view of the fitting and mounting in rotation of the blade by its bearing on a hub.

The blade designed for a helicopter tail rotor of the streamlined type, and essentially made of composite materials, as after moulding in a single operation and represented in FIG. 1, includes in its running portion 1, which extends from blade tip 2 (at its outer extremity, at the end opposite that by which the blade is attached to a hub) to a blade footing 3 (on the inner end, towards the hub), a shell 4 having the shape of the desired aerodynamic profile, which is a profile that develops along the span, for example of the type described below with reference to FIGS. 4a to 4c.

The shell 4, which encloses filling bodies and the spar described in greater detail below with reference to FIGS. 2 to 4c, is a shell whose pressure face covering 4a and suction face covering 4b, extending continuously from leading edge 5 to trailing edge 6, along which trailing edge these coverings are joined to one another, form a laminated skin constituted by a piling including, from inside to outside, two superposed mats or sheets of carbon fibres, extending longitudinally and substantially parallel to leading edge 5 or to the longitudinal axis of pitch change of the blade, and a layer of fabric of aramide fibres, for example of KEVLAR, arranged so that the warp and weft threads, crossed at right angles to one another, are inclined at an angle of approximately 45° to the direction of leading edge 5 or of the longitudinal axis of the blade, the whole composed of these two mats or sheets and of this layer being agglomerated by a synthetic impregnation resin polymerised by thermosetting, in such a way as to form a box ensuring the rigidity in torsion of the whole of the blade, this box being externally covered by a film of adhesive which ensures the good external surface condition of the shell 4 after leaving the mould. The blade in FIG. 1 also comprises a cap 7 for protecting leading edge 5, with a U shaped cross-section (see FIG. 2) whose pressure face wing 7a extends further from leading edge 5 and towards trailing edge 6 than suction face wing 7b, cap 7 extending, along the span, from the transition zone by which running portion 1 is attached to blade footing 3, up to blade tip 2, and cap 7 being integrated with shell 4 and made of titanium sheet, to protect the blade from natural erosive elements such as water and sand, or even of polyurethane, which possesses better resistance to erosion by sand, and whose manufacture in the form of a moulding makes it possible to obtain the outer profile of the blade with precision, with a protective thickness which, matching the spectrum of erosion, is greater at leading edge 5 than on wings 7a and 7b.

The blade in FIG. 1 also includes a root portion 8, rigid in a longitudinal direction and flexible in torsion and flexion, which is shaped to form a loop surrounding a socket 9 for attachment to the hub (not shown). This socket 9 is a tubular component cast in one piece, for example of light alloy, which enables the blade to be fixed to a hub, as described in above-mentioned French patent application No.83 04 448, to which it will be convenient to refer for further details regarding the structure of the hub of the multi-blade propeller, the said fixing being ensured by a bolt whose shank fits in the central bore of socket 9 positioned so that its axis is, for example, parallel to the axis of rotation of the hub.

The root portion 8, which surrounds the metallic socket 9, being wound through a groove around this socket, is formed by the inner end portion of a spar, constituted by a single elongated skein of unidirectional rovings of KEVLAR agglomerated by a synthetic impregnation resin polymerised by thermosetting, in such a way that the two end portions 10a and 10b, which extend over approximately two thirds of the length of the skein are received in shell 4, while the median portion of the said skein, extending over approximately one third of its length constitutes the root portion 8 in the form of a loop passing about socket 9 and whose two bundles 8a and 8b are each extended by one of the two end portions 10a and 10b of the spar respectively.

As shown in FIGS. 2, 3 and 4a to 4c, the spar is designed way that the two portions 10a and 10b have a substantially rectangular cross-section and form two bundles parallel to one another, and to the longitudinal axis of the blade, spaced apart from one another on either side of the said longitudinal axis, one, 10a, in front of, and the other, 10b, behind the said axis, so that the two-spar structure thus formed is centered on the longitudinal axis or axis of change of pitch of the blade and each bundle 10a or 10b adheres directly through the cementing of its pressure face and suction face surfaces to the internal faces of the opposite portions of pressure face covering 4a and suction face covering 4b respectively of shell 4, which delimits a large surface resistant to the induced shearing of trailing flexion.

The spar emerges from shell 4 passing through blade footing 3 in two portions 11a and 11b of bundles 10a and 10b which are pressed and thrust against one another in blade footing 3, the structure of which is more precisely described below with reference to FIGS. 5 and 6, and these portions 11a and 11b extend outside shell 4, each by one of the two bundles 8a, 8b respectively of the looping root portion 8. The flexibility in torsion of this root portion 8 is obtained from the combined effects of the low shearing modulus of the unidirectional rovings of KEVLAR of bundles 8a and 8b of the spar and through the geometrical shape of the said bundles 8a and 8b which, as represented in FIGS. 3 and 7, each have a thickness (see FIG. 7), measured parallel to the axis of the central bore of socket 9, which increases progressively from the compressed portions 11a, 11b in blade footing the internal end of the spar passing around socket 9, while the width of each bundle 8a, 8b (see FIG. 3), measured substantially perpendicularly to the axis of socket 9, decreases progressively from the compressed portions 11a, 11b to socket 9, in such a way that the section of each bundle remains constant.

In shell 4, spar bundles 10a and 10b delimit with pressure face covering 4a and suction face covering 4b three longitudinal cavities each enclosing one of the three filling bodies, of low-density polyurethane foam, one of which, 12a, is a leading edge filling body, housed at the front of forward core 10a, a second one of which, 12b, is a central filling body, housed between cores 10a and 10b, and the third one of which, 12c, is a trailing edge filling body, housed at the rear of rear core 10b, and substantially wedge-shaped in section.

In addition, a leading edge reinforcement 13, constituted by several longitudinal layers of reinforcement fibres, such as carbon strands, agglomerated by a polymerised synthetic impregnation resin, is housed at the front of forward filling body 12a, and between the portions of pressure face covering 4a and suction face covering 4b that are directly adjacent to leading edge 5. The function of this leading edge reinforcement 13 is to prevent hammering of protective cap 7 on leading edge 5, during flights through a sand-laden atmosphere.

In its running portion 1, the blade thus has a balanced two-spar structure, with a triple torsion box, such that, in the event of impact or deterioration, at the leading edge or the trailing edge, the structure retains sufficient torsional rigidity for control of the blade. In addition, the arrangement of the spar folded back into two halves and surrounding attaching socket 9 permits a natural, favourable alignment of the rovings of the spar, which, as described below, allows polymerisation under tension, the effect of which is to endow it with better breaking strength.

As shown in FIGS. 4a to 4c, the profile of the blade thus develops progressively, along the span, for example, from a dissymmetric biconvex section (FIG. 4a) in the transition zone by which blade footing 3 is linked to running portion 1 of the blade, to a section having a convex suction face surface and a concave pressure face surface, which is slightly cambered in the middle of running portion 1 (FIGS. 3 and 4b) and whose curvature increases progressively to reach a maximum at blade tip 2 (see FIGS. 3 and 4c). This profile development enables the aerodynamic efficiency of the rotor to be optimised.

In FIG. 4a, it can be seen that, in transition zone 14 by which blade footing 3 is connected to running portion 1, pressure face reinforcement 15a and suction face reinforcement 15b are placed between the lower and upper faces respectively of spar bundles 10a, 10b of filling bodies 12a, 12b, 12c and of leading edge reinforcement 13, on one hand, and, on the other hand, the inner faces of the opposite portions of pressure face covering 4a and suction face covering 4b respectively of the shell, and the structure of these reinforcements 15a and 15b, as well as that of blade footing 3, is described in greater detail below with reference to FIGS. 3, 5 and 6.

Each of reinforcements 15a and 15b is laminated and constituted by a piling of several layers of fabric of glass fibres, which are agglomerated by a polymerised synthetic impregnation resin and arranged in such a way that their warp threads are crossed at right angles layer by layer and inclined substantially at an angle of 45° to the direction of leading edge 5 or the longitudinal axis of the blade. The thickness of each laminated reinforcement decreases from running portion 1 towards blade footing 3, through the fact that the different layers of each piling are of different lengths along the span and from blade footing 3.

As shown in FIGS. 3 and 5, each of the reinforcements such as 15b is constituted by four layers such as 16b1 to 16b4, of which the fourth layer or external layer 16b4, directly beneath suction face covering 4b, extends along the span over approximately the inner half of shell 4, up to footing 3, the third layer 16b3 of which extends directly beneath layer 16b4 but only over approximately the inner third of shell 4, the second layer 16b2 of which extends partially beneath layer 16b3 and substantially over approximately the inner quarter of shell 4, and finally the first or internal layer 16b1 of which extends directly below layer 16b2 and directly over two spar bundles 10a, 10b and the three filling bodies 12a, 12b and 12c, but only over approximately 1/5 of the length of shell 4, counting from footing 3. As clearly shown in FIG. 5, the four layers, 16b1 to 16b4, are superposed progressively from the outer edge of the upper layer 16b4 towards footing 3, and up to a subdivision area 17b, at which suction face reinforcement 15b is subdivided into two portions, namely a radial portion internal, in relation to the axis of the blade, comprising the inner two layers 16b1 and 16b2, and an external radial portion, comprising the outer two layers 16b3 and 16b4.

Starting from subdivision area 17b and up to a circular radial flange 18 forming the inner axial end of blade footing 3, towards root portion 8, inner portion 16b1–16b2 of suction face reinforcement 15b remains applied to the upper faces of foam bodies 12a to 12c and of spar bundles 10a, 10b, in the compressed portions 11a and 11b thereof, at which the bundles of rovings of the spar are of a minimum thickness, which is also that of the thinnest adjacent portion of bundles 8a and 8b of looped root portion 8. Similarly, from subdivision 17b up to flange 18, outer portion 16b3–16b4 of suction face reinforcement 15b continues to hug suction face covering 4b, being separated from internal portion 16b1–16b2 by a complementary suction face filling element 19b, of polyurethane foam, with a wedge-shaped longitudinal section and a thickness progressively increasing towards flange 18, against which the said element 19b is applied. The hugging portions of the inner ends of suction face covering 4b and of layers 16b3 and 16b4 of the outer portion of suction face reinforcement 15b are radially curved, perpendicularly to axis AA of the blade to form a radial suction face collar 20*b*, hugging flange 18 and rendered integral therewith.

As shown in FIG. 6, in which the elements of the suction face portion of the blade footing that have just been described are to be found, the similar elements of the pressure face portion of the blade footing are arranged substantially symmetrically in relation to the median plane lying on the longitudinal axis AA of the blade. In this way, a complementary pressure face filling element 19*a*, likewise of polyurethane foam and hugging flange 18, separates internal portion 16*a*1–16*a*2 of pressure face reinforcement 15*a*, which continues to hug the lower face of filling bodies 12*a* to 12*c*, cores 10*a*, 10*b* and their portions 11*a*, 11*b* thus compressed, from outer portion 16*a*3–16*a*4 of pressure face reinforcement 15*a*, which continues to hug pressure face covering 4*a*, and the inner ends of the latter and of outer layers 16*a*3 and 16*a*4 of suction face reinforcement 15*a* form a radial suction face collar 20*a*, hugging flange 18 and rendered integral therewith.

Transition zone 14 is thus of decreasing thickness from flange 18 to running portion 1, and, in its portion adjacent to flange 18, this zone 14 develops quickly and has a thickness that decreases swiftly and a width that increases swiftly in the direction of running portion 1. For this reason, as shown in FIG. 3, layers 16*b*1 to 16*b*4, which are substantially rectangular and progressively increasing in width and length, contract considerably in the end portion towards flange 18. This flange 18, which is designed to render blade footing 3 integral with a member for controlling the pitch of the blade, described below with reference to FIG. 8, is constituted by several layers, radial in relation to axis AA of the blade and each in the form of an annular disc, of fabric of glass fibres that are placed and agglomerated with one another by a polymerised synthetic impregnation resin. Four bolts, 22, uniformly spaced apart about axis AA of the blade, circumferentially, are anchored to the flange 18 by their heads which are encapsulated, after the fashion of inserts, in layers 21 so that their threaded skeins project axially in relation to flange 18 towards socket 9, and can be used for mechanically fixing a metallic bearing equipped with the pitch control member on blade footing 3. Finally, in the central portion of its face orientated towards socket 9, flange 18 has a cylindrical recess centered on axis AA and in which is held by cementing an annular seal 23, which is axially traversed by portions 11*a* and 11*b*, pressed against one another, of bundles 10*a* and 10*b* of the spar.

Blade footing 3, thus essentially reinforced by glass fibre fabrics, ensures good take-up of the forces and moments of flapping and trailing of the blade in service, and it is favourably arranged for application of the moments of pitch control to root portion 8, flexible in torsion, of the blade, from the pitch control member.

In this example, the said member is a metallic bearing for fitting the blade on a hub and guiding it on rotation thereon. As shown in FIG. 8, the said bearing 24, which is mechanically and removably fixed to flange 18 of blade footing 3, is a cylindrical sleeve, through which root portion 8 of the spar passes axially. At its axial end towards socket 9, bearing 24 has an outer radial flange 25, the periphery of which forms a cylindrical bearing journal 26 for rotation and which bears, projecting in relation to axis AA and axially towards socket 9, a pitch control finger 27 designed to be articulated with a ball joint on the end of a pitch control lever. At its other axial end, bearing 24 also has a cylindrical bearing journal for rotation 29, delimited on the outside of a collar axially attached to the periphery of a radial flange 28 pierced by four holes in which are engaged the skeins of bolts 22 of flange 18 of blade footing 3, when bearing 24 is placed in contact by its flange 28 with flange 18, so that its journal 29 surrounds the periphery of flange 18. By screwing nuts 30 onto the skeins of bolts 22, the two flanges 18 and 28 are made integral with one another, thus fixing the bearing 24 to blade footing 3.

The two journals 26 and 29 are thus centered on longitudinal axis AA of the blade and enable bearing 24 and the blade to be mounted in rotation in two coaxial openings, of corresponding diameter, that are provided in two walls radially spaced apart from one another on the hub, as described in the above-mentioned French patent application.

The blade, whose structure has been described above with reference to FIGS. 1 to 7, that is to say without its metallic bearing 24, is manufactured in accordance with a process described below, and implemented using a mould schematically represented in FIG. 9.

This mould includes two complementary half-moulds, one of which is a lower half-mould 31 which has an internal impression the shape of which corresponds transversely and longitudinally to the shape of the pressure face portion of the blade, and the other one of which is an upper half-mould 32 which has an inner impression whose shape corresponds, under the same conditions, to that of the suction face portion of the blade.

Each impression, such as that of half-mould 31, comprises a main recess 33 whose shape corresponds to that of running portion 1 of the blade, and which is connected via a small, deeper recess 34, the shape of which corresponds to that of blade footing 14, to two grooves 35*a* and 35*b* having the shapes of bundles 8*a* and 8*b* respectively of the looped portion of the spar. These grooves 35*a* and 35*b* join together at their ends adjacent to small recess 34 and emerge, at their opposite ends, in a housing 36 substantially cylindrical in shape, designed to receive socket 9 and the portion of loop 8 of rovings that passes round it and, between their ends, grooves 35*a* and 35*b* are separated from one another by a wedge-shaped core 37, facilitating the production of the particular shape of bundles 8*a* and 8*b*.

The bottoms of recesses 33 and 34 are coated with a film of adhesive, designed to ensure a good surface condition after removal from the mould, after cutting out, on one hand, an elongated layer of fabric of KEVLAR fibres preimpregnated by a thermosetting resin, which includes two adjacent panels on either side of longitudinal median axis corresponding to the leading edge of shell 4, and designed to form respectively the outer layer of pressure face coating 4*a* and of suction face coating 4*b* of shell 4, and, on the other hand, two elongated mats or sheets of carbon fibres also preimpregnated with the same resin and each having, under the same conditions, two panels of adjacent mats or sheets on either side of the same axis, to form the superposed inner mats or sheets of pressure face and suction face covers 4*a* and 4*b* respectively. The pressure face panel of the layer of KEVLAR fabric is then deposited on the film of adhesive in recess 33 of the impression of lower half-mould 31, the suction face panel of this layer being left outside lower half-mould 31, on the leading edge side, and the pressure face panels of the two mats or sheets of carbon are then deposited successively in the same way on this panel of KEVLAR fabric, so as to pile up the three plies of pressure face cover 4a. The outer two layers 16a4 then 16a3 of fabric of glass fibres preimpregnated with resin, which are designed to form the outer portion of pressure face reinforcement 15a, are then placed in succession on this piling, after which the complementary pressure face filling element of polyurethane foam, 19a, is positioned on the said layers 16a4 and 16a3, and in small recess 34. The two inner layers 16a2 and then 16a1 of fabric of glass fibres preimpregnated with resin that are designed to form the inner portion of pressure face reinforcement 15a are then spread in succession, covering foam element 19a, after which the three foam filling bodies, 12a to 12b, are put into place, as well as the carbon strands preimpregnated with resin of the longitudinal reinforcement 13 of the leading edge. The spar is then put in place. For this purpose, use is made of a skein of unidirectional KEVLAR rovings preimpregnated with resin and forming at one of its ends a close loop that is flattened, as shown at 38 in FIG. 9, so that it has two substantially parallel bundles, and that one end portion, with a developing section to form bundles 8a and 8b of root portion 8, can be engaged in the central passage of several annular discs 21 of fabric of glass fibres preimpregnated with resin that are placed in contact with one another and designed to form flange 18 of the blade footing. This end portion of the closed, flattened loop of rovings 38 extends beyond adjoining layers 21 and also passes through a seal 23, which is coated with a film of adhesive and introduced into a recess in the face of the assembly of adjoining discs 21. The end portion of loop 38 beyond seal 23 and adjoining discs 21 is then passed around a socket 9. Then loop 38, socket 9 and adjoining layers 21 with seal 23 are placed in lower half-mould 31 so that socket 9 and the portion of loop 38 surrounding it are introduced into housing 36, that the two portions of the corresponding end portion of loop 38, which will form bundles 8a, 8b of root portion 8, are placed in grooves 35a and 35b on either side of central core 37, that adjoining layers 21, seal 23 and the portions of loop 38 that pass through them are placed in small recess 34 in order for adjoining layers 21 to be radial and placed in contact with the complementary pressure face filling element of foam, 19a, as well as with the end portions of layers 16a3 and 16a4 of the outer half of pressure face reinforcement 15a and of the layer and of the mats or sheets of pressure face covering 4a, which are well engaged in the bottom of recess 34 so as to form a radial collar 20a for connection to the adjoining layers 21, that the two large portions substantially parallel to one another of loop 38, on the other side of socket 9 in relation to adjoining layers 21, are housed one between filling bodies 12a and 12b, to form the forward bundle 10a, and the other between filling bodies 12b, 12c, to form the rear bundle 10b of the spar, and finally that the end of loop 38, which is opposite that surrounding socket 9, extends beyond the end of the portion of lower half-mould 31 that has recess 33 of the impression, and also surrounds a socket 39 which is axially engaged and held on a pin 39' mounted on lower half-mould 31, in order that its axis and that of socket 39 should be maintained parallel with that of socket 9. The position of pin 39' is adjustable longitudinally over lower half-mould 31, in the direction of the axis of the blade formed in the mould, so that skein 38 is subjected to longitudinal tension. Then the two layers of glass fibres 16b1 and 16b2 of the inner half of suction face reinforcement 15b are successively put into place above filling bodies 12a to 12c and the spar, complementary suction face filling element 19b, made of polyurethane foam, is positioned on layers 16b1 and 16b2, and against adjoining layers 21 and then the two layers of glass fibres 16b3 and 16b4 of the outer half of suction face reinforcement 15b are spread out in position over layers 16a1 and 16a2 and element 19b. Finally, the suction face panels of the two carbon mats or layers and the suction face panel of the layer of glass fibre fabric, which have been held outside the impression of lower half-mould 31, are now folded back in succession over the piling placed in lower half-mould 31, so as to form suction face covering 4b.

Then, after positioning protective cap 7 of leading edge, the mould can be closed a first time by fitting upper half-mould 32 over lower half-mould 31, in order to compact the piling, then the mould can be opened again in order to coat the two recesses of the impression of upper half-mould 32 with a film of adhesive to ensure the good surface condition of the moulded blade. The mould is then closed once again and subjected to a heat treatment for polymerising the thermosetting impregnation resin, skein 38 of the KEVLAR rovings of the spar being maintained constantly under longitudinal tension.

After polymerisation of the resin, the longitudinal tension applied to loop 38 is removed and the mould is opened for the purpose of stripping, and it then suffices to cut the end of loop 38 surrounding tension socket 39 and which projects from shell 4, using a cutting or sawing means 40, as diagrammatically represented in FIG. 10, in order to obtain the blade according to FIGS. 1 to 7. Naturally, inserts 22 can be anchored in flange 18 thus formed, during a single moulding operation. Polymerisation of the spar under tension improves its tensile strength, which can be up to twice that obtained by polymerisation without tensioning, and it permits excellent repeatability of the mode of operation, owing to the uniform tension applied to the rovings during the hardening of the resin that agglomerates them.

In this way, a spar is obtained that combines great mechanical strength in the longitudinal direction, enabling it to absorb the centrifugal forces applied to the blade with a very slight elongation, with relative flexibility, particularly in the root portion in loop 8 and in torsion about its longitudinal axis, which makes it possible to control changes in the pitch of the blade by applying to shell 4 and the spar of the blade twisting moments centered on their common longitudinal axis, and of a relatively small value.

The blade for a streamlined tail rotor of a helicopter, essentially of composite materials, and as represented in FIG. 11 after moulding in a single operation, comprises in its running portion 41, between blade tip 42, at its free end or outer end, and blade footing 43, on the inner side, designed to be orientated towards the hub to which the blade will be mounted, a rigid shell 44 having the shape of the desired aerodynamic profile, which is a constant profile along the span. The said shell 44, which encloses two filling bodies and a spar described in greater detail below with reference to FIG. 12, is a shell constituted by pressure face and suction face coverings extending continuously from leading edge 45 to trailing edge 46, along which these coverings are connected to one another, and each including a laminated pressure face skin 44a and a laminated suction face skin 44b respectively, internally lined, from leading edge 45 and over approximately three quarters of its width along the chord of the blade, towards trailing edge 46, by a pressure face reinforcing sole 53a and a suction face reinforcing sole 53b respectively.

Each of skins 44a and 44b is constituted by a piling comprising, from inside to outside, two superposed, crossed layers of fabric of aramide fibres (for example of KEVLAR) whose warp and weft threads are inclined substantially at an angle of 45° to the longitudinal axis of the blade or to the direction of leading edge 45, and which are agglomerated by a synthetic impregnation resin polymerised by thermosetting, so as to form a box ensuring the rigidity in torsion of the whole of the blade, the said box being covered externally with a film of adhesive, which ensures the good outer surface condition of shell 44, after it leaves the mould.

The blade in FIG. 11 also includes a cap 47 for protecting leading edge 45, this cap 47 having (see FIG. 12) a cross-section in the form of an U with a pressure face wing 47a that extends further towards trailing edge 46 than suction face wing 47b, and cap 47 extending from a transition zone via which running portion 41 is attached to blade footing 43, up to blade tip 42. The said cap 47 is integrated with shell 44 and made of titanium or moulded polyurethane, to protect the blade from erosive elements (such as water or sand) with a profile corresponding to that of the blade and a thickness that is greater at leading edge 45 than on wings 47a and 47b.

The blade in FIG. 11 also includes a root portion 48, rigid in a longitudinal direction and flexible in torsion about the longitudinal axis, and which is shaped to form a loop surrounding a socket 49 for attachment to the hub (not represented). Loop 49 is a tubular component cast in one piece in light alloy permitting the attachment of the blade to a hub such as the one described in above-mentioned French patent application No.83 04 448, to which reference should be made for further details as to its structure, fixing being ensured by means of a bolt whose shank passes through the central bore of socket 49, which is positioned in such a way that its axis is parallel to the axis of rotation of the hub.

Root portion 48 which is wound around socket 49 is formed by the internal end portion of a spar constituted by winding into a skein unidirectional rovings of aramide fibres agglomerated by a polymerised synthetic impregnation resin. The two bundles constituting the skein are, over approximately two thirds of their length towards their outer end, longitudinally adjoined to one another so as to form a single solid, full bundle 50 (see FIG. 12) in the shape of a strip, substantially plane, with a rectangular section of which the largest section dimension is orientated along the chord of the blade and which is received in shell 44, while the other end of the skein extending over approximately the inner third constitutes the looped root portion 48 that is formed by the two bundles, 48a and 48b, which are wound round socket 49 and extend into shell 44, joining into a single bundle forming spar 50.

As shown in FIGS. 12 and 13, the bundle of rovings 50 of the spar is designed in such a way as to form a strong mono-spar structure centered on the longitudinal axis of the blade. It adheres directly through the cementing of its pressure face and suction face surfaces to the internal faces of the opposite portions of pressure face sole 53a and suction face sole 53b respectively reinforcing the skin 44a, 44b of shell 44, which delimits a large surface resistant to induced flexion shearing.

The spar emerges from shell 44 passing through blade footing 43 in two portions 51a and 51b; linking respectively each of the two adjoining portions constituting the single bundle 50 to one of the corresponding bundles 48a or 48b of root portion 48 and to the outside of shell 44. These two portions 51a and 51b are pressed together in blade footing 43, whose structure is described in greater detail below with reference to FIG. 13.

The flexibility in torsion of the root portion 48 is obtained by the combined effects of the low shearing modulus of the unidirectional rovings of bundles 48a and 48b of the spar and by the geometrical shape of these lengths, which, as shown in FIGS. 11 and 13, each have a length, parallel to the axis of socket 49, which increases progressively from compressed portion 51a and 51b, at which the thickness of the bundle is minimum, up to the portion of the bundle passing around socket 49, while the width of each bundle 48a and 48b, measured perpendicularly to the axis of socket 49 and the longitudinal axis of the blade, decreases progressively from compressed portions 51a and 51b to socket 49.

The function of root portion 48 is dual: on one hand, it takes up the centrifugal force and, on the other hand, it permits the angular deflections of the blade necessary for pitch control, without mechanical articulation.

Each of reinforcing soles 53a and 53b of the pressure face and suction face coverings of blade 44 is constituted by a piling of five longitudinal mats or sheets, of differing widths along the chord, of carbon fibres agglomerated by a polymerised synthetic impregnation resin. The width of these five piled carbon mats or sheets increases from one mat to the other and from the inner mat to the outer mat of the piling, starting from leading edge 45 and going towards trailing edge 46, as shown in FIG. 12. Placed on either side of bundle 50 of the spar, to which soles 53a and 53b adhere directly, these soles rigidify the section of the blade against flapping forces in shell 44. Central bundle 50 of the spar delimits, with soles 53a, 53b and skins 44a, 44b of the pressure face and suction face coverings respectively, two longitudinal cavities each containing a filling of the same nature as soles 53a and 53b. The longitudinal mats or sheets of carbon fibres agglomerated by a polymerised synthetic impregnation resin, which constitute, on one hand, leading edge filling 52a, at the front of bundle 50, and, on the other hand, trailing edge filling 52b, at the rear of bundle 50, have the effect of rigidifying the blade in the trailing plane.

The carbon mats or sheets of soles 53a, 53b and of fillings 52a and 52b are agglomerated with one another as well as with the layers of fabric of the skin of coverings 44a and 44b and with rovings of bundle 50 by the polymerised impregnation resin or resins.

In its running portion 41, the blade thus has a mono-spar balanced structure, with a double torsion box. In the event of impact or deterioration at the leading edge or the trailing edge, this structure retains sufficient torsional rigidity for the control of the blade. In addition, the arrangement of the spar as a skein surrounding socket 49 permits natural alignment of the KEVLAR rovings starting from socket 49, which permits, as described below, polymerisation of the KEVLAR rovings under longitudinal tension, having the effect of imparting to them enhanced ultimate tensile strength.

In FIG. 13, representing blade footing 43 in longitudinal section, the said footing is designed, in its portion orientated towards socket 49, as a tubular end piece 58, slightly frustoconical in shape with its small based located towards socket 49, and the said tubular end piece 58 is connected to running portion 41 of the blade by a transition portion 54, which has a thickness decreasing progressively from end piece 58 to running portion 41. This transition portion 54, which is a doubly evolutive zone, since it also has a width (along the chord) that increases slightly and progressively from running portion 41 towards end piece 58, as represented in FIG. 11, includes, from outside to inside, the end portions of skins 44a and 44b and of the carbon mats or sheets of soles 53a, 53b and of filling bodies 52a, 52b, these longitudinal mats or sheets of unidirectional carbon fibres forming, at the said transition portion 54, pressure face and suction face reinforcements, 55a and 55b respectively, extending beneath skins 44a and 44b, and covering a collar or bond 56, which clamps together portions 51a, 51b of the halves of the bundle of the spar that cross blade footing 43. This bond or collar 56 is constituted by a piling of layers of glass fibres agglomerated by a polymerised synthetic resin, and the piling has a thickness that increases progressively from running portion 41 to end piece 58, then a thickness constant in an end portion of the said bond or collar 56 that is orientated towards socket 49 and which penetrates end piece 58, in which it grips a shouldered portion of a seal 63, through which pass bundles 48a and 48b of looped root portion 48 of the spar.

End piece 58 is formed of a frustoconical, peripheral sleeve 62, constituted by a piling of layers of fabric of glass fibres agglomerated by a polymerised synthetic impregnation resin, and which is partially closed at its large base, towards transition portion 54, by an annular abutment 61, also constituted by layers of fabric of glass fibres, which are cut into annular discs radially adjoined in relation to the axis of sleeve 62 and of the spar, and agglomerated by a polymerised synthetic impregnation resin, so that internal cavity 57 of the end piece 58 opens towards socket 49 over practically the entire section of the small base of sleeve 62.

The portion of constant thickness of bond or collar 56 that is received in end piece 58 penetrates internal cavity 57 of sleeve 62 passing through the central passage of annular abutment 61, while remaining surrounded by the end portions of the carbon mats or sheets of pressure face and suction face reinforcements, 55a and 55b, which are separated from skins 44a and 44b of the pressure face and suction face coverings at the inner radial edge of the face orientated towards transition portion 54 of annular radial abutment 61. In this way, transition portion 54 is connected to end piece 58 at the inner radial edge of the face of annular abutment 61 that is orientated towards the said portion 54, and this face of abutment 61 is covered by the end portion of pressure face and suction face covering skins, 44a and 44b, which also surround a strip of outer peripheral surface of sleeve 62, at its large base.

The portion of seal 63 that is not received in the end of bond or collar 56 inside end piece 58 is also surrounded by pressure face and suction face reinforcements, 55a and 55b, in mats or sheets of carbon corresponding to the ends of soles 53a, 53b and of filling bodies 52a, 52b, and these reinforcements 55a and 55b form an internal lining of a complementary filling of polyurethane foam, constituted by two bodies, pressure face body 59a and suction face body 59b respectively, each having the shape of semi-circular body with an axial section substantially in the form of a right-angled trapezium. These two bodies 59a, 59b are completed and are abutted to form, in substantially half of end piece 58 towards the transition portion 54, a centering ring surrounding bond or collar 56 and seal 63, and maintained applied by the large base, the height and right angle formed by the latter in each of its sections, respectively against the inner face of sleeve 62, the inner lateral face of radial abutment 61 and in the angle delimited by these faces, with the help of carbon mat or sheet reinforcements 55a and 55b, which cover the inclined inner face of bodies 59a and 59b, and form an inner lining of the inner face of sleeve 62, to which these reinforcements adhere in substantially half of the said sleeve towards socket 49.

The function of seal 63 is to prevent blade footing 43 from being penetrated by elements such as dust or drops of water which, under the effect of centrifugal force, tend to move along lengths 48a, 48b of the spar, and, to prevent water in particular from accumulating in the recess 57, and against seal 63, an evacuation passage 60 is pierced through the lower complementary filling body 59a and radial abutment 61, and this passage is angled downwards and outwards, in the centrifugal direction, from the inclined face of this body 59a which is orientated towards recess 57 as far as the outer lateral face of abutment 61, this evacuation passage also emerging through the skin of pressure face covering 44a which covers this outer face of abutment 61.

With the exception of the complementary filling of polyurethane foam, 59a, 59b, blade footing 43 is thus primarily constituted by fabric of glass fibres and mats or sheets of carbon agglomerated by the polymerised synthetic resin. The glass fibre fabrics are used to produce abutment 61, sleeve 62 and bond or collar 56. The function of the said bond or collar 56, in surrounding portions 51a, 51b of the spar, is to prevent the bundle of rovings of the spar from opening under the effect of centrifugal force. The choice of glass fibres to produce this element permits a certain compatibility of elongation, under the effect of centrifugal force, between the KEVLAR rovings of the spar, inside bond or collar 56, and the mats or sheets of carbon of reinforcements 55a and 55b, outside bond or collar 56.

These mats or sheets of carbon, arranged longitudinally in relation to leading edge 45 of the blade, open out in running portion 41, where they form soles 53a, 53b, as well as leading or forward edge filling bodies 52a and trailing or rear edge filling bodies 52b. These mats or sheets of carbon impart great rigidity to the whole of the structure.

Thus designed, blade footing 43 ensures good take-up of the forces and moments of flapping and trailing that are applied to the blade, and permits the application of pitch control forces to root portion 48, flexible in torsion, via a pitch control member.

This pitch control member, illustrated in FIG. 14, is a metallic bearing 64 that ensures the fitting and sliding in rotation of the blade on the hub as schematically represented in FIG. 16 and described below.

Bearing 64 in FIG. 14 takes the form of a tubular barrel, designed to be traversed by root portion 48 of the blade and which includes, on the side orientated towards socket 49 in utilisation position, a cylindrical piece with a circular cross-section, 64a, which is extended, on the side opposite socket 49, by a frustoconical central flared portion 64b, divergent and itself extended, in the same direction, by a frustoconical section 64c, also divergent on the side opposite socket 49, but with an angle of taper far smaller than that of flared portion 64b. In this way, cylindrical piece 64a, which bears a pitch control lever-67 radially projecting in relation to the axis of bearing 64 and which is equipped at its free end with a ball joint finger 67a articulated with a pitch control link, for example a device for collectively controlling the pitch of the blades of a multiblade propeller, of the type described in the above-mentioned French patent application, has inside and outside diameters less than the inside and outside diameters respectively of slightly frustoconical section 64c, even at the small base of the latter, at its end towards central flared portion 64b. The free axial end of piece 64a is surrounded by a ring 65, whose outer lateral surface has a peripheral, cylindrical journal 66. Similarly, the free axial end of section 64c is surrounded by a ring 68, whose outer lateral surface has a peripheral, cylindrical journal 69. Rings 65 and 68 are wearing parts which it must be possible to replace if necessary. For this reason, they are fixed to the axial ends of barrel 64 by simple shrinking on ensured by hot fitting. Their cylindrical journals 66 and 69 are constituted by a very hard ceramic surfacing, which prolongs the useful life of the rings.

Finally, bearing 64 has a static balancing weight 70, which is constituted by a small lead wire encapsulated in a polyester resin filling a cavity provided between frustoconical section 64c and the end, located towards central flared portion 64b, of large diameter ring 68.

Metallic bearing 64 is fixed to blade footing 43 by taper fitting of the "Morse taper" type of frustoconical section 64c of bearing 64 onto frustoconical end piece 58 of the blade footing 43, a film of adhesive being interposed between the two frustoconical surfaces thus facing.

Figure 15:
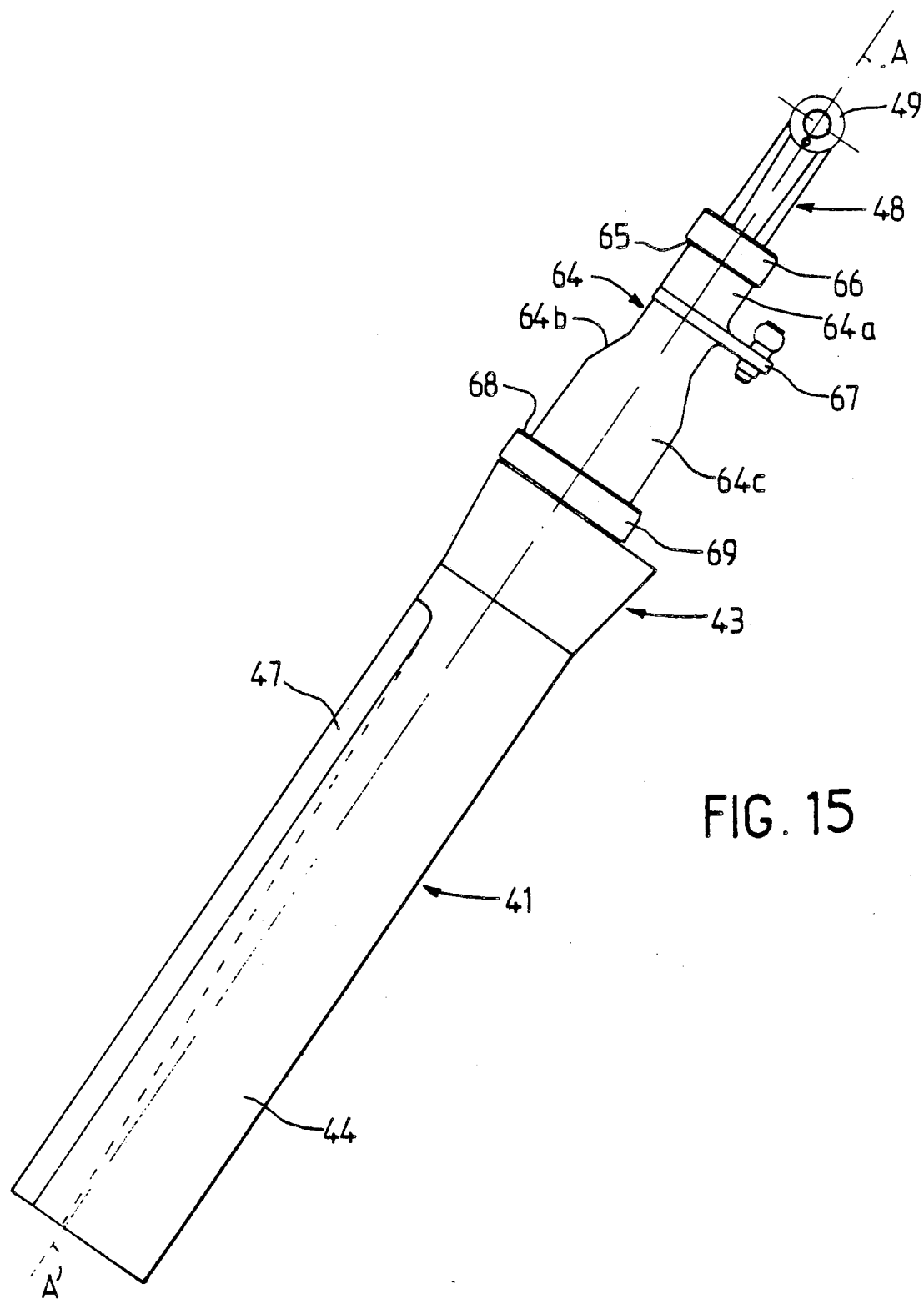

The blade, as after moulding according to FIG. 11 and thus equipped with its pitch control bearing 64, is shown in plan view in FIG. 15, ready for mounting on a propeller hub as described in the above-mentioned patent application.

The type of fitting used to fix bearing 64 to blade footing 43 has the advantages of ensuring a good pressure of adherence to the surfaces in contact, which cannot be obtained by cylindrical fitting, and of endowing the cemented bond with a fault-proof character ("fail-safe" character). Indeed, the orientation of the frustoconical elements, whose small axis is on the side orientated towards socket 49 for connection to the hub, is such that, in the event of failure of adherence, metallic bearing 64 subject to centrifugal forces is maintained in abutment against end piece 58 of blade footing 43, as schematically represented in FIG. 16. In this figure, arrow F shows the direction of the centrifugal forces that impel bearing 64 against frustoconical end piece 58 of footing 43 of the blade maintained by its root portion 48 and the corresponding attaching socket 49 on the hub, when the blade is driven in rotation by the said hub. It appears that a very small angle of taper, in the order of a few degrees, suffices to procure sufficient adherence for transmission of the pitch control torque, applied by lever 67 to bearing 64, and, by the latter, to end piece 58 of blade footing 43, which transfers it to the rigid shell 44 and thus to root portion 48 in the form of a twisting moment centered on longitudinal axis AA of the blade.

FIG. 16 also diagrammatically represents the mounting in rotation and fitting of bearing 64 onto a hub comprising two parts 71 and 72 radially separated from one another in relation to the axis of rotation (not shown) of the hub. A circular opening with a diameter corresponding to the outside diameter of small ring 65 is provided in internal radial portion 71 of the hub, and a circular opening coaxial with that of portion 71 is also provided in external radial portion 72 of the hub, but with a diameter corresponding to that of outside diameter of large ring 68, so that journals 66 and 69 of rings 65 and 68 constitute the surfaces of contact with the hub, by which bearing 64 is mounted to journal in the openings of portions 71 and 72 of the hub, about their common axis, which is also the longitudinal axis AA of the blade. The maximum interval between rings 65 and 68, placed at the axial ends of bearing 64, favours a good fitting and correct guiding in rotation on the hub.

The blade, the structure of which has just been described above with reference to FIGS. 11 to 13, that is to say without its metallic bearing 64, is manufactured in accordance with a process described below, and implemented using a mould such as the one schematically represented in FIG. 9 and including two complementary half-moulds, whereof lower half-mould 31 has an inner impression whose shape corresponds, along the chord and along the span, to the shape of the pressure face portion of the blade, and whereof upper half-mould 32 also has an inner impression the shape of which corresponds, under the same conditions, to that of the suction face portion of the blade.

For these reasons, principal recess 33 and the small, deeper recess 34 of each impression, such as that of lower half-mould 31, have shapes corresponding respectively to those of running portion 41 and of blade footing 54, while the two grooves 35a and 35b have the shapes respectively of lengths 48a and 48b of looped root portion 48 of the blade, between small recess 34 of the blade footing and recess 36 for receiving, in lower half-mould 31, attaching socket 49 and loop portion 48 of the spar that surrounds it, and on either side of central core 37, in the shape of a wedge, facilitating production of the particular shape of bundles 48a and 48b.

A film of solid adhesive is spread in the bottom of recesses 33 and 34 of the impression of lower half-mould 31. Then, after cutting the two elongated layers of KEVLAR fabric preimpregnated with a thermosetting resin, so that each layer includes two adjacent panels on either side of a longitudinal median axis, corresponding to the leading edge of shell 44, these panels being designed to belong one to pressure face skin 44a and the other to suction face skin 44b, the two panels of pressure face 44a are spread, superposing them, in recesses 33 and 34 of lower half-mould 31, leaving the suction face panel of each layer outside lower half-mould 31, on the leading edge side. Next, the layers of preimpregnated glass fibre fabric of the pressure face half of sleeve 62 and the adjoining, preimpregnated annular layers of abutment 61 are placed in small recess 34, then complementary foam pressure face filling element 59a is put into place. Next to be deposited in succession and superposed, under the same conditions as for the panels of KEVLAR layers, are the pressure face panels of five longitudinal mats or sheets of unidirectional preimpregnated carbon fibres, the width of which differs from one panel to the next, and designed to form pressure face sole 53a, the suction face panels of these mats or sheets being left outside lower half-mould 31, again on the leading edge side. The longitudinal mats or sheets of unidirectional preimpregnated carbon fibres designed to form filling bodies 52a and 52b are then spread out. At recess 34 of the blade footing, the ends of these carbon mats or sheets are introduced into the central passage of the discs of abutment 61, then spread over foam element 59a and against the glass fibre fabric layers of sleeve 62. The superposed panels of the layers of fabric of preimpregnated glass fibres of the pressure face portion of bond or collar 56 are then positioned, followed by the skein of unidirectional preimpregnated KEVLAR rovings of the spar, this skein forming a closed, flattened loop, as shown at 38 in FIG. 9, so as to present two halves substantially folded back on one another, and so that one end portion with a developing section to form bundles 48a, 48b of root portion 48 can be engaged in the central passage of the annular discs of glass fibre fabric of abutment 61, this end portion of the closed loop of rovings 38 extending beyond these layers of abutment 61 and also passing through a seal 63, partially coated with adhesive and applied to the layers of glass fibre fabric of the pressure face portion of bond or collar 56. The end portion of loop 38 beyond seal 63 and the adjoining discs of abutment 61 is then passed around socket 49, then this loop portion 38 and socket 49 are placed in recess 36 and in grooves 35a and 35b on either side of central core 37, and the two large portions substantially parallel to one another of loop 38, on the other side of spool 49 in relation to the adjoining discs of abutment 61 are placed against one another between the mats or sheets of carbon of filling bodies 52a and 52b, to form the central, solid bundle of the spar. The end of skein 38 which is on the side opposite socket 49 extends beyond the end of the portion of lower half-mould 31 that has recess 33 of the impression, and it also passes round a spool 39 that is engaged and held axially on a pin 39' mounted on lower half-mould 31 so that its axis and that of spool 39 are maintained parallel to that of socket 49, and the position of pin 39' is advantageously adjustable longitudinally on lower half-mould 31, so that skein 38 is subjected to longitudinal tension. The suction face panels of the layers of glass fibre fabric of bond or collar 56, which is arranged as shown in FIG. 13, inside the central passage of abutment 61 and above a seal 63 are then placed on compressed portions 51a, 51b of the spar. Then the panels of mats or sheets of carbon forming suction face sole 53b are folded back on the spar and suction face reinforcement 55b is folded back on bond or collar 56 and engaged in the discs of annular abutment 61, complementary suction face filling element 59b is put in position and sleeve 62 is completed by positioning layers of glass fibre fabric, possibly with the help of a moulding mandrel positioned in small recess 34 of the blade footing. The suction face panels of the two layers of KEVLAR fabric of suction face skin 44b are then folded back, and the mould is closed by fitting the upper half-mould onto lower half-mould 31, in order to compact the piled assembly that they contain. After re-opening the mould, the cap of leading edge 47 is positioned, then the mould is reclosed after previously coating the impression of upper half-mould 32 with a film of adhesive, and then follows heat treatment for polymerising the impregnation resin, the closed loop of rovings being maintained under tension. After polymerisation, the mould is opened to strip the blade and, finally, the end portion of the roving loop surrounding the traction spool is cut off to obtain the blade as shown in FIG. 11.

This process thus follows the main stages used in the process for manufacturing the first blade example. In particular, use is made once more of the stage of polymerisation under tension of the rovings of the spar, which is advantageously permitted by their particular arrangement ensuring their alignment in the prolongation of the socket.

The blade according to the second example has a solid structure which, unlike the blade of the first example, does not comprise elements of low-density foam, with the exception of the two small complementary filling elements of the blade footing. Now, such foam fillings have the advantage of absorbing variations in volume connected with the tolerance on the ratio of impregnation with polymerisable resin of the preimpregnated elements that are assembled in the mould. That is why it is necessary, when manufacturing the blade according to the second example, to effect a correction in terms of mass of the elements, at the time of moulding, by means of a film of adhesive having a density equal to that of the resin, thus making it possible to observe the conservation of volumes.

We claim:
1. Process for manufacturing a blade, by means of a lower half-mould and an upper half-mould providing complementary impressions having respective forms of a pressure face portion and a suction face portion of the blade, comprising:

desposting in the lower half-mould a panel of each of separate layers of fabric and mats or sheets of reinforcing fibers with high mechanical strength impregnated with a polymerisable synthetic resin, and designed to constitute a pressure face covering of a shell of the blade, putting in place, over the panels, materials constituting filling bodies, and in an area of a blade footing, the layers of fabric and mats or sheets of reinforcing fibers, impregnated with a polymerizable synthetic resin, of the pressure face portion of the shell, putting in place, over the panels and layers of fabric and mats or sheets of fibers for reinforcing the pressure face portion of the blade, and between the filling bodies, end portions, designed to be fixed in the shell, of two bundles of an elongated skein folded back on itself, constituted by rovings of aramide fibers agglomerated by a polymerisable synthetic resin designed to form a spar of the blade, and arranging, beyond a corresponding end of the panels, layers of fabrics and mats or sheets of reinforcing fibers and filling bodies, the portions of the two bundles that are in the vicinity of an area of folding so as to form a loop designed to constitute a root portion of the spar, and that passes round a metallic socket placed in the lower half-mould, a putting in place, in the area of the blade footing and over the spar, the layers of fabric and mats or sheets of reinforcing fibers impregnated with a polymerizable synthetic resin of the suction face portion of the shell, arranging on the whole thus formed in the lower half-mould, a panel of each of the layers of fabrics and mats or sheets of fibers with high mechanical strength impregnated with a polymerizable synthetic resin designed to constitute a suction face covering of the shell, placing the upper half-mould on the lower half-mould placing the rovings of the two bundles of the skein of the spar in longitudinal traction, substantially parallel to a longitudinal axis of the blade, closing the mold, polymerising the resin or resins impregnating and/or agglomerating all of the elements enclosed in the mould, so as to mould the blade in a single operation, maintaining traction on the rovings throughout polymerisation; and after polymerisation is complete, removing the blade from the mould.

2. Process according to claim 1, further comprising winding, in order to form the spar, a skein of rovings forming a closed, elongated loop, and arranging this skein in the mould, so that an end portion on the side opposite that surrounding the attaching socket projects longitudinally beyond the impressions of the half-molds and surrounds a tension socket held on a pin mounded in at least one of the half molds, and, after polymerisation and removal from the mould, cutting off any excess portion of the spar.

3. Process according to claim 2, further comprising, in addition to cutting off any excess portion of the spar, cutting off a portion of the end of the shell and of the filling bodies.

4. Process according to one of claims 1 or 2, further comprising placing the layers of fabric of a bond or collar, an abutment and a sleeve or a radial flange of the blade footing, and complementary filling elements of polyurethane foam in the pressure face and suction face portions of the blade, respectively before and after putting in place the skein of rovings of the spar.

5. Process according to claim 1, further comprising initially spreading of a film of adhesive in portions of the impressions of the half-molds corresponding to the shell of the blade, in order to obtain a good surface condition of the shell after leaving the mould.

* * * * *